US012586253B2

(12) United States Patent
Kim et al.

(10) Patent No.: US 12,586,253 B2
(45) Date of Patent: Mar. 24, 2026

(54) SIGNALING DISPLACEMENT DATA FOR VIDEO-BASED MESH CODING

(71) Applicant: Apple Inc., Cupertino, CA (US)

(72) Inventors: Jungsun Kim, Sunnyvale, CA (US); Alexandros Tourapis, Los Gatos, CA (US); Khaled Mammou, Danville, CA (US)

(73) Assignee: Apple Inc., Cupertino, CA (US)

( * ) Notice: Subject to any disclaimer, the term of this patent is extended or adjusted under 35 U.S.C. 154(b) by 94 days.

(21) Appl. No.: 18/494,679

(22) Filed: Oct. 25, 2023

(65) Prior Publication Data

US 2024/0144541 A1        May 2, 2024

Related U.S. Application Data

(60) Provisional application No. 63/381,122, filed on Oct. 26, 2022.

(51) Int. Cl.
*G06T 9/00* (2006.01)

(52) U.S. Cl.
CPC ................................... *G06T 9/001* (2013.01)

(58) Field of Classification Search
CPC ...... G06T 9/001; H04N 19/46; H04N 19/597; H04N 19/70
See application file for complete search history.

(56) References Cited

U.S. PATENT DOCUMENTS 11,017,591 B2    5/2021    Oh
11,115,680 B2    9/2021    Ikonin 11,494,947 B2    11/2022    Mammou
11,627,314 B2     4/2023    Tourapis
2008/0063085 A1*  3/2008    Wu ...................... H04N 19/117
                                              375/240.26
2013/0121415 A1*  5/2013    Wahadaniah .......... H04N 19/61
                                              375/240.12

(Continued)

FOREIGN PATENT DOCUMENTS

CN        108009979        2/2021
CN        117197263       12/2023

(Continued)

OTHER PUBLICATIONS

Khaled Mammou, et al., "[V-CG] Apple's Dynamic Mesh Coding CfP Response," International Organisation for Standardisation, ISO/ IEC JTC 1/SC 29/WG 7, Coding of Moving Pictures and Audio, Apple Inc., Online Apr. 2022, pp. 1-24.

(Continued)

*Primary Examiner* — Xiao M Wu
(74) *Attorney, Agent, or Firm* — Alexander A. Knapp; Kowert, Hood, Munyon, Rankin & Goetzel, P.C.

(57)                ABSTRACT

A system comprises an encoder configured to compress and encode data for a three-dimensional mesh. To compress the three-dimensional mesh, the encoder determines displacements to be applied to sub-division locations of a base mesh. The displacement values may be signaled in their own sub-bitstream, e.g., a dedicated displacement data sub-bitstream, or may be signaled, at least in part, in an atlas data sub-bitstream that includes patch data. In some embodiments, the displacements may also be signaled, at least in part, in a video sub-bitstream or in a base-mesh sub-bitstream.

20 Claims, 16 Drawing Sheets

(56)  References Cited

U.S. PATENT DOCUMENTS

| 2021/0287431 | A1 |  | 9/2021 | Woop |  |
|---|---|---|---|---|---|
| 2022/0150509 | A1 | * | 5/2022 | Rosewarne | ............ H04N 19/70 |
| 2022/0239949 | A1 |  | 7/2022 | Hannuksela |  |
| 2023/0388544 | A1 | * | 11/2023 | Xu | ......................... H04N 19/46 |
| 2024/0127489 | A1 | * | 4/2024 | Graziosi | ................. G06T 9/001 |
| 2024/0185469 | A1 | * | 6/2024 | Joshi | .................... H04N 19/172 |

FOREIGN PATENT DOCUMENTS

| DE |  | 69818558 | T2 | 8/2004 |
|---|---|---|---|---|
| KR |  | 100511719 | B1 | 9/2005 |
| WO |  | 2024063544 |  | 3/2024 |

OTHER PUBLICATIONS

Khaled Mammou, et al., EE 4.7 on Displacement Coding, International Organization for Standardization, Source: WG 7, MPEG Coding for 3D Graphics and Haptics, Online Jul. 2022, pp. 1-4.
International Search Report and Written Opinion from PCT/US2023/035987, dated Jan. 24, 2024, pp. 1-12.

* cited by examiner

Mesh with
texture M(i)

Connectivity
C(i)

Geometry
G(i)

Texture
image A(i)

Texture
Connectivity TC(i)

Coordinate 1;
Coordinate 2;
...

Texture
Coordinates T(i)

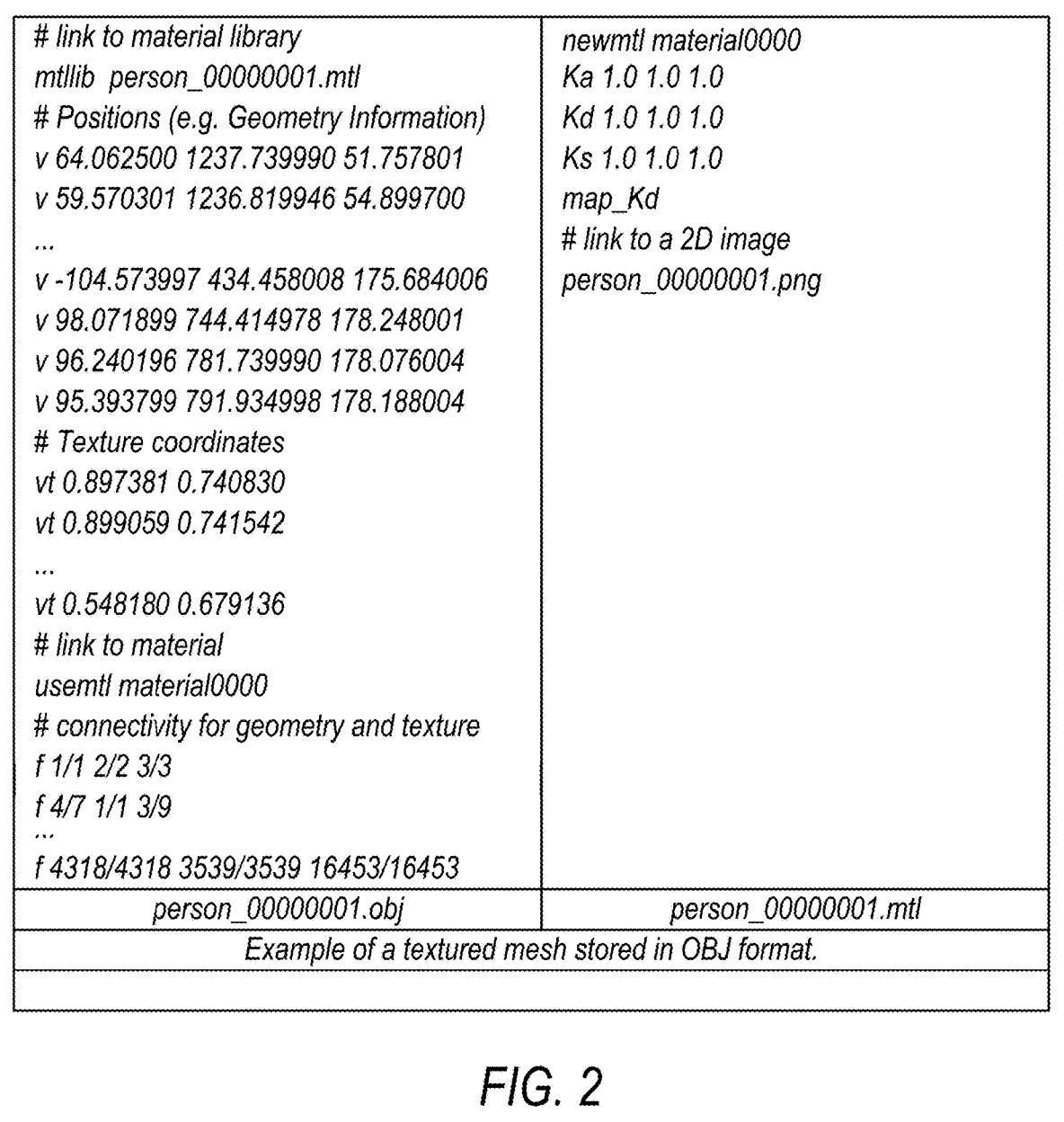

| # link to material library | newmtl material0000 |
|---|---|
| mtllib  person_00000001.mtl | Ka 1.0 1.0 1.0 |
| # Positions (e.g. Geometry Information) | Kd 1.0 1.0 1.0 |
| v 64.062500 1237.739990 51.757801 | Ks 1.0 1.0 1.0 |
| v 59.570301 1236.819946 54.899700 | map_Kd |
| ... | # link to a 2D image |
| v -104.573997 434.458008 175.684006 | person_00000001.png |
| v 98.071899 744.414978 178.248001 | |
| v 96.240196 781.739990 178.076004 | |
| v 95.393799 791.934998 178.188004 | |
| # Texture coordinates | |
| vt 0.897381 0.740830 | |
| vt 0.899059 0.741542 | |
| ... | |
| vt 0.548180 0.679136 | |
| # link to material | |
| usemtl material0000 | |
| # connectivity for geometry and texture | |
| f 1/1 2/2 3/3 | |
| f 4/7 1/1 3/9 | |
| ... | |
| f 4318/4318 3539/3539 16453/16453 | |
| person_00000001.obj | person_00000001.mtl |
| Example of a textured mesh stored in OBJ format. ||

FIG. 2

----- Edge to be subdivided
--·-- Edge not to be subdivided
——— Edge introduced by the adaptive subdivision process

<V plane>

| C02 | C12 | C22 | C32 |
|-----|-----|-----|-----|
| C42 | C52 | C62 | ... |
|     |     |     |     |
|     |     |     |     |

<U plane>

| C01 | C11 | C21 | C31 |
|-----|-----|-----|-----|
| C41 | C51 | C61 | ... |
|     |     |     |     |
|     |     |     |     |

<Y plane>

| C00 | C00 | C10 | C10 | C20 | C20 | C30 | C30 |
|-----|-----|-----|-----|-----|-----|-----|-----|
| C00 | C00 | C10 | C10 | C20 | C20 | C30 | C30 |
| C40 | C40 | C50 | C50 | C60 | C60 |     |     |
| C40 | C40 | C50 | C50 | C60 | C60 |     |     |
|     |     |     |     |     |     |     |     |
|     |     |     |     |     |     |     |     |
|     |     |     |     |     |     |     |     |
|     |     |     |     |     |     |     |     |

*FIG. 13*

SIGNALING DISPLACEMENT DATA FOR VIDEO-BASED MESH CODING

PRIORITY CLAIM

This application claims benefit of priority to U.S. Provisional Application Ser. No. 63/381,122, entitled "Signaling Displacement Data for Video-Based Mesh Coding," filed Oct. 26, 2022, and which is incorporated herein by reference in its entirety.

BACKGROUND

Technical Field

This disclosure relates generally to compression and decompression of three-dimensional meshes with associated textures or attributes.

Description of the Related Art

Various types of sensors, such as light detection and ranging (LIDAR) systems, 3-D-cameras, 3-D scanners, etc. may capture data indicating positions of points in three-dimensional space, for example positions in the X, Y, and Z planes. Also, such systems may further capture attribute information in addition to spatial information for the respective points, such as color information (e.g., RGB values), texture information, intensity attributes, reflectivity attributes, motion related attributes, modality attributes, or various other attributes. In some circumstances, additional attributes may be assigned to the respective points, such as a time-stamp when the point was captured. Points captured by such sensors may make up a "point cloud" comprising a set of points each having associated spatial information and one or more associated attributes. In some circumstances, a point cloud may include thousands of points, hundreds of thousands of points, millions of points, or even more points. Also, in some circumstances, point clouds may be generated, for example in software, as opposed to being captured by one or more sensors. In either case, such point clouds may include large amounts of data and may be costly and time-consuming to store and transmit. Also, three-dimensional visual content may also be captured in other ways, such as via 2D images of a scene captured from multiple viewing positions relative to the scene.

Such three-dimensional visual content may be represented by a three-dimensional mesh comprising a plurality of polygons with connected vertices that models a surface of three-dimensional visual content, such as a surface of a point cloud. Moreover, texture or attribute values of points of the three-dimensional visual content may be overlaid on the mesh to represent the attribute or texture of the three-dimensional visual content when modelled as a three-dimensional mesh.

Additionally, a three-dimensional mesh may be generated, for example in software, without first being modelled as a point cloud or other type of three-dimensional visual content. For example, the software may directly generate the three-dimensional mesh and apply texture or attribute values to represent an object.

SUMMARY OF EMBODIMENTS

In some embodiments, a system includes one or more sensors configured to capture points representing an object in a view of the sensor and to capture texture or attribute values associated with the points of the object. The system also includes one or more computing devices storing program instructions, that when executed, cause the one or more computing devices to generate a three-dimensional mesh that models the points of the object using vertices and connections between the vertices that define polygons of the three-dimensional mesh. Also, in some embodiments, a three-dimensional mesh may be generated without first being captured by one or more sensors. For example, a computer graphics program may generate a three-dimensional mesh with an associated texture or associated attribute values to represent an object in a scene, without necessarily generating a point cloud that represents the object.

In some embodiments, an encoder system includes one or more computing devices storing program instructions that when executed by the one or more computing devices, further cause the one or more computing devices to determine a plurality of patches for the attributes three-dimensional mesh and a corresponding attribute map that maps the attribute patches to the geometry of the mesh.

The encoder system may further encode the geometry of the mesh by encoding a base mesh and displacements of vertices relative to the base mesh. A compressed bit stream may include a compressed base mesh, compressed displacement values, and compressed attribute information. In order to improve compression efficiency, coding units may be used to encode portions of the mesh. For example, encoding units may comprise tiles of the mesh, wherein each tile comprises independently encoded segments of the mesh. As another example, a coding unit may include a patch made up of several sub-meshes of the mesh, wherein the sub-meshes exploit dependencies between the sub-meshes and are therefore not independently encoded. Also, higher level coding units, such as patch groups may be used. Different encoding parameters may be defined in the bit stream to apply to different coding units. For example, instead of having to repeatedly signal the encoding parameters, a commonly signaled coding parameter may be applied to members of a given coding unit, such as sub-meshes of a patch, or a mesh portion that makes up a tile. Some example encoding parameters that may be used include entropy coding parameters, intra-frame prediction parameters, inter-frame prediction parameters, local or sub-mesh indices, amongst various others.

In some embodiments, displacement values may be signaled in a sub-bitstream other than a video sub-bitstream, such as in their own sub-bitstream. For example, a dynamic mesh encoder may generate a bit stream comprising a displacement data sub-bitstream, in addition to a base mesh sub-bitstream, an atlas data sub-bitstream, etc. In some embodiments, signaling the displacement information at least partially outside of the video sub-bitstream may enable out of order decoding. Also, this may enable using different levels of detail to reconstruct sub-meshes, as well as allowing displacements to be signaled in a relative manner. For example, a displacement for a given sub-mesh may be signaled relative to a baseline displacement signaled at a higher-level, such as in a sequence parameter set, frame header, etc. In such embodiments, a network abstraction layer unit (NAL unit) syntax may be used for the displacement data sub-bitstream, such as NAL unit headers, sequence parameter sets, frame parameter sets, tile information, etc. In such embodiments, a displacement data unit may be defined using NAL units. Also, in some embodiments, displacement values may be signaled in an atlas data sub-bitstream, for example along with patch data. In some embodiments, the displacement values may be signaled in the atlas data sub-bitstream using patch data units, or, in some embodiments, displacement data units maybe signaled in the atlas data sub-bitstream, for example along with patch data units. Also, in some embodiments, displacement values may be signaled in a hybrid manner, with some displacement values signaled in a video sub-bitstream and other displacement values signaled outside of the video sub-bitstream, such as in the atlas data sub-bitstream, or in a displacement data sub-bitstream.

BRIEF DESCRIPTION OF THE DRAWINGS

FIG. 2 illustrates an alternative example of input information for defining a three-dimensional mesh, wherein the input information is formatted according to an object format, according to some embodiments.

Figures 10A, 10B, 10C, 10D:
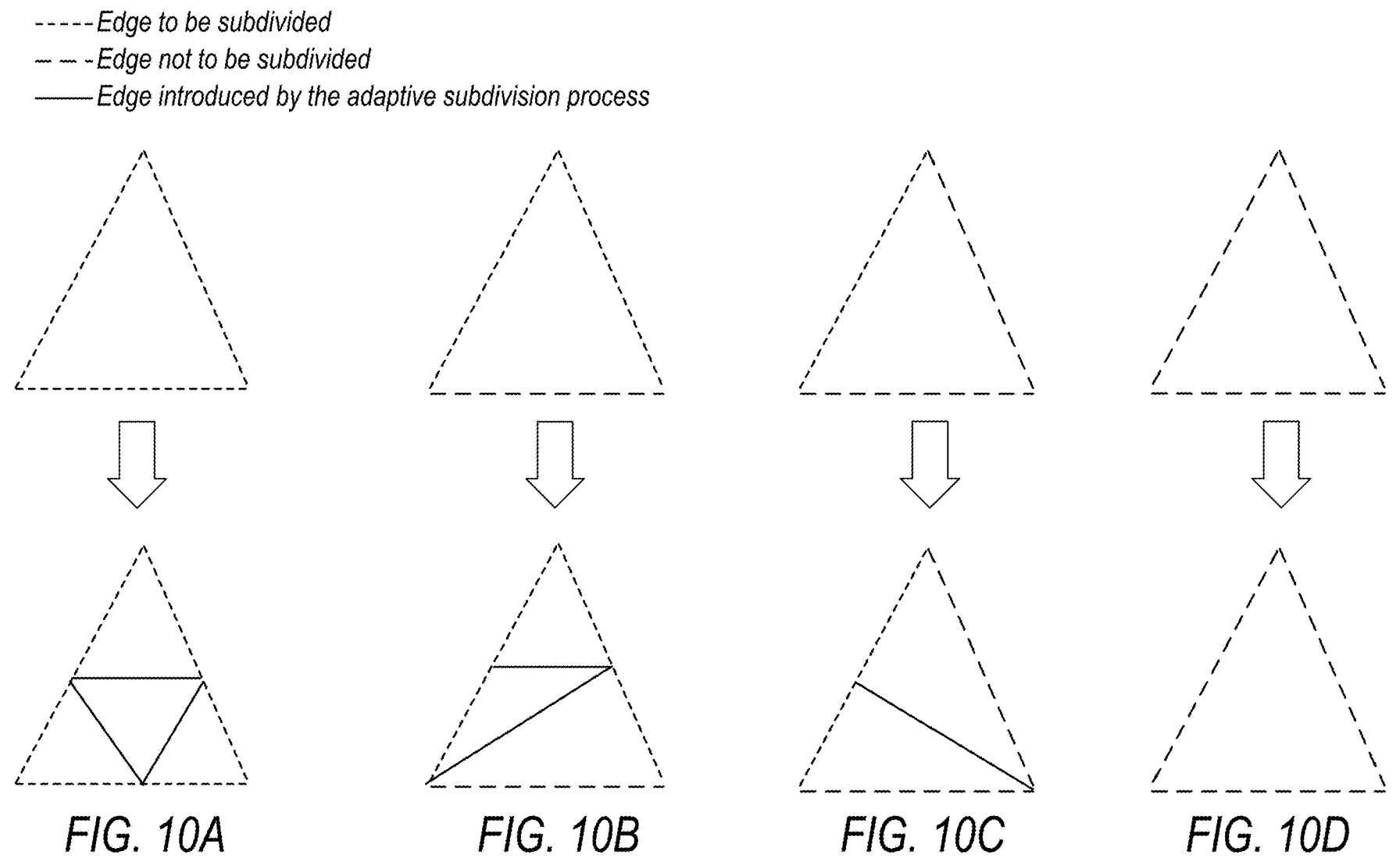

FIGS. 10A-10D illustrate adaptive sub-division based on edge subdivision rules for shared edges, according to some embodiments.

FIG. 13 illustrates example color planes of a video sub-bitstream used, at least in part, to signal displacement values, according to some embodiments.

Figure 1:
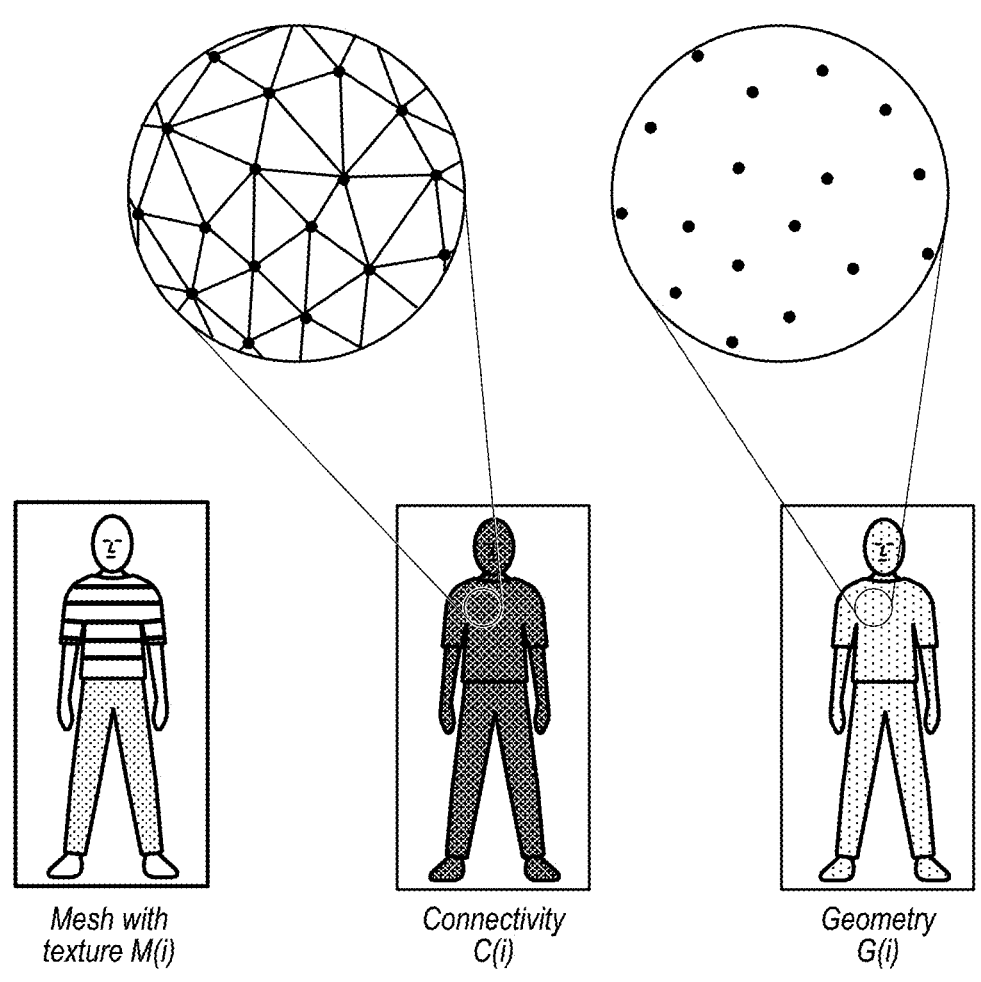
FIG. 1 illustrates example input information for defining a three-dimensional mesh, according to some embodiments.
Figure 1:
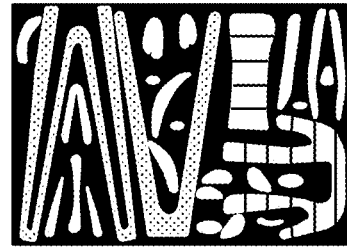
Figure 1:
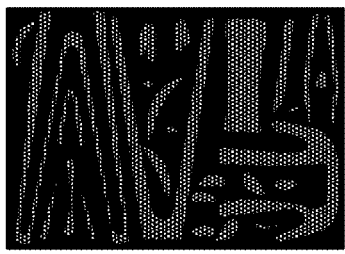

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

As data acquisition and display technologies have become more advanced, the ability to capture volumetric content comprising thousands or millions of points in 2-D or 3-D space, such as via LIDAR systems, has increased. Also, the development of advanced display technologies, such as virtual reality or augmented reality systems, has increased potential uses for volumetric content. However, volumetric content files are often very large and may be costly and time-consuming to store and transmit. For example, communication of volumetric content over private or public networks, such as the Internet, may require considerable amounts of time and/or network resources, such that some uses of volumetric content, such as real-time uses, may be limited. Also, storage requirements of volumetric content files may consume a significant amount of storage capacity of devices storing the volumetric content files, which may also limit potential applications for using volumetric content data.

In some embodiments, an encoder may be used to generate compressed volumetric content to reduce costs and time associated with storing and transmitting large volumetric content files. In some embodiments, a system may include an encoder that compresses attribute and/or spatial information of volumetric content such that the volumetric content file may be stored and transmitted more quickly than non-compressed volumetric content and in a manner that the volumetric content file may occupy less storage space than non-compressed volumetric content.

In some embodiments, such encoders and decoders or other encoders and decoders described herein may be adapted to additionally or alternatively encode three-degree of freedom plus (3DOF+) scenes, visual volumetric content, such as MPEG V3C scenes, immersive video scenes, such as MPEG MIV, etc.

In some embodiments, a static or dynamic mesh that is to be compressed and/or encoded may include a set of 3D Meshes M(0), M(1), M(2), . . . , M(n). Each mesh M(i) may be defined by a connectivity information C(i), a geometry information G(i), texture coordinates T(i) and texture connectivity CT(i). For each mesh M(i), one or multiple 2D images A(i, 0), A(i, 1) . . . , A(i, D−1) describing the textures or attributes associated with the mesh may be included. For example, FIG. 1 illustrates an example static or dynamic mesh M(i) comprising connectivity information C(i), geometry information G(i), texture images A(i), texture connectivity information TC(i), and texture coordinates information T(i). Also, FIG. 2 illustrates an example of a textured mesh stored in object (OBJ) format.

For example, the example texture mesh stored in the object format shown in FIG. 2 includes geometry information listed as X, Y, and Z coordinates of vertices and texture coordinates listed as two dimensional (2D) coordinates for vertices, wherein the 2D coordinates identify a pixel location of a pixel storing texture information for a given vertex. The example texture mesh stored in the object format also includes texture connectivity information that indicates mappings between the geometry coordinates and texture coordinates to form polygons, such as triangles. For example, a first triangle is formed by three vertices, where a first vertex (1/1) is defined as the first geometry coordinate (e.g., 64.062500, 1237.739990, 51.757801), which corresponds with the first texture coordinate (e.g., 0.0897381, 0.740830). The second vertex (2/2) of the triangle is defined as the second geometry coordinate (e.g., 59.570301, 1236.819946, 54.899700), which corresponds with the second texture coordinate (e.g., 0.899059, 0.741542). Finally, the third vertex of the triangle corresponds to the third listed geometry coordinate which matches with the third listed texture coordinate. However, note that in some instances a vertex of a polygon, such as a triangle may map to a set of geometry coordinates and texture coordinates that may have different index positions in the respective lists of geometry coordinates and texture coordinates. For example, the second triangle has a first vertex corresponding to the fourth listed set of geometry coordinates and the seventh listed set of texture coordinates. A second vertex corresponding to the first listed set of geometry coordinates and the first set of listed texture coordinates and a third vertex corresponding to the third listed set of geometry coordinates and the ninth listed set of texture coordinates.

In some embodiments, the geometry information G(i) may represent locations of vertices of the mesh in 3D space and the connectivity C(i) may indicate how the vertices are to be connected together to form polygons that make up the mesh M(i). Also, the texture coordinates T(i) may indicate locations of pixels in a 2D image that correspond to vertices of a corresponding sub-mesh. Attribute patch information may indicate how the texture coordinates defined with respect to a 2D bounding box map into a three-dimensional space of a 3D bounding box associated with the attribute patch based on how the points were projected onto a projection plane for the attribute patch. Also, the texture connectivity information TC(i) may indicate how the vertices represented by the texture coordinates T(i) are to be connected together to form polygons of the sub-meshes. For example, each texture or attribute patch of the texture image A(i) may correspond to a corresponding sub-mesh defined using texture coordinates T(i) and texture connectivity TC(i).

Figure 3:
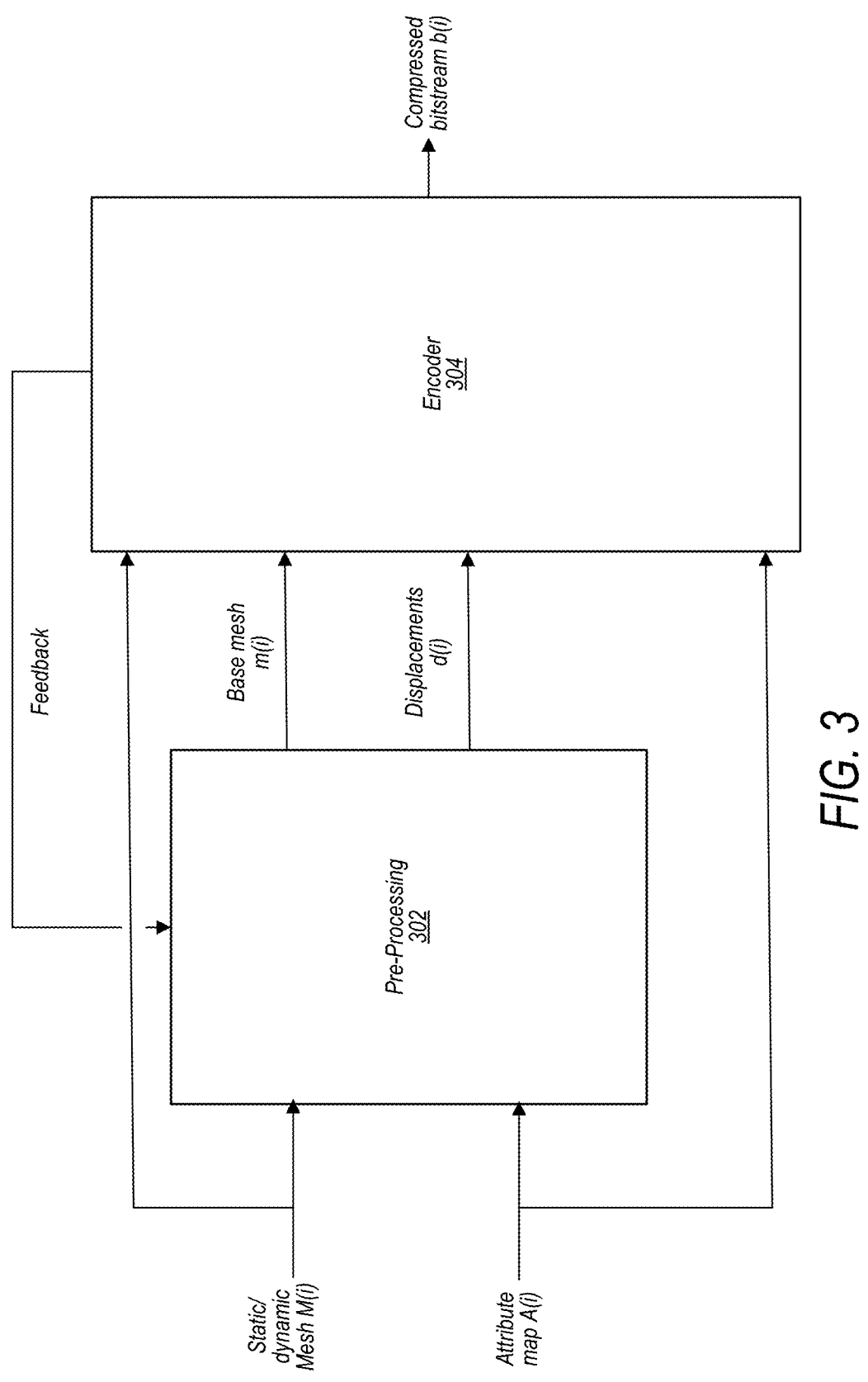
FIG. 3 illustrates an example pre-processor and encoder for encoding a three-dimensional mesh, according to some embodiments.

In some embodiments, a mesh encoder may perform a patch generation process, wherein the mesh is subdivided into a set of sub-meshes. The sub-meshes may correspond to the connected components of the texture connectivity or may be different sub-meshes than the texture connectivity of the mesh. In some embodiments, a number and a size of sub-meshes to be determined may be adjusted to balance discontinuities and flexibility to update the mesh, such as via inter-prediction. For example, smaller sub-meshes may allow for a finer granularity of updates to change a particular region of a mesh, such as at a FIG. 3 illustrates a high-level block-diagram of an encoding process in some embodiments. Note that the feedback loop during the encoding process makes it possible for the encoder to guide the pre-processing step and changes its parameters to achieve the best possible compromise according to various criteria, such as: rate-distortion, encoding/decoding complexity, random access, reconstruction complexity, terminal capabilities, encoder/decoder power consumption, network bandwidth and latency, and/or other factors.

Figure 4:
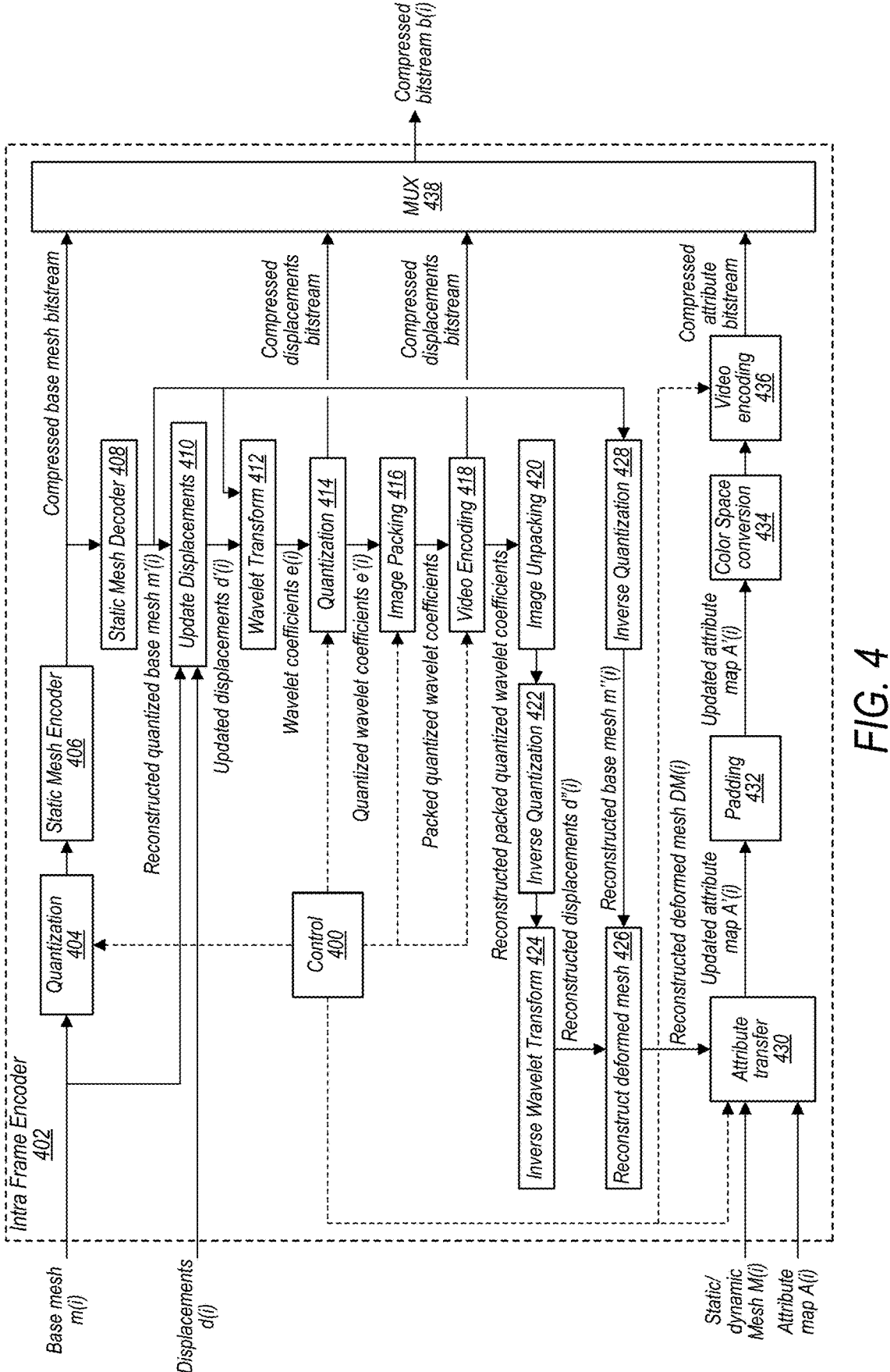
FIG. 4 illustrates a more-detailed view of an example intra-frame encoder, according to some embodiments.
Figure 5:
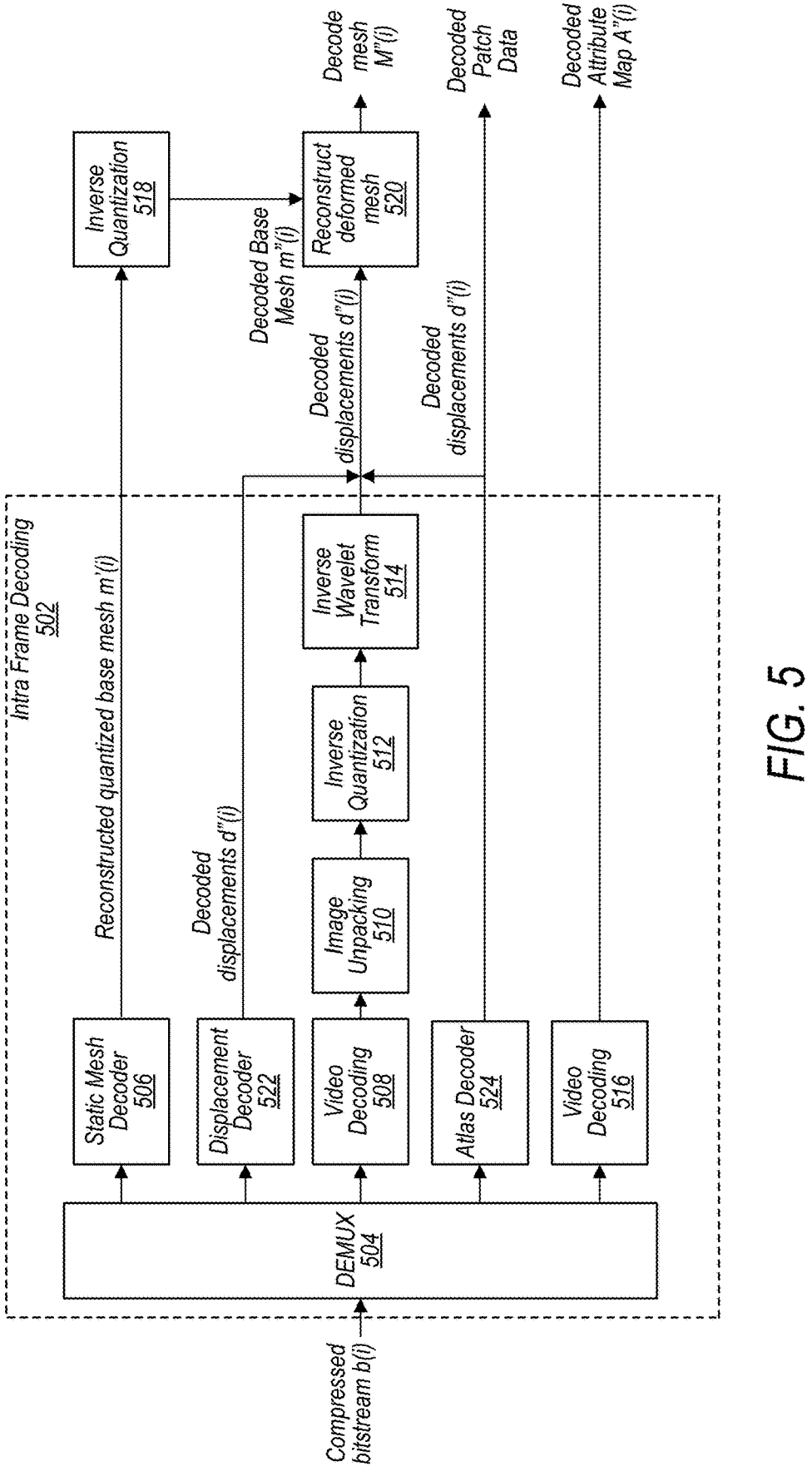
FIG. 5 illustrates an example intra-frame decoder for decoding a three-dimensional mesh, according to some embodiments.

A mesh that could be either static or dynamic is received at pre-processing module 302. Also, an attribute map representing how attribute images (e.g., texture images) for the static/dynamic mesh are to be mapped to the mesh is received at pre-processing module 302. For example, the attribute map may include texture coordinates and texture connectivity for texture images for the mesh. The pre-processing module 302 separates the static/dynamic mesh M(i) into a base mesh m(i) and displacements d(i). Where the displacements represent how vertices are to be displaced to re-create the original static/dynamic mesh from the base mesh. For example, in some embodiments, vertices included in the original static/dynamic mesh may be omitted from the base mesh (e.g., the base mesh may be a compressed version of the original static/dynamic mesh). As will be discussed in more detail below, a decoder may predict additional vertices to be added to the base mesh, for example by sub-dividing edges between remaining vertices included in the base mesh. In such an example, the displacements may indicate how the additional vertices are to be displaced, wherein the displacement of the added vertices modifies the base mesh to better represent the original static/dynamic mesh. For example, FIG. 4 illustrates a detailed intra frame encoder 402 that may be used to encode a base mesh m(i) and displacements d(i) for added vertices. For dynamic meshes, an inter frame encoder, such as shown in FIG. 5 may be used. As can be seen in FIG. 5, instead of signaling a new base mesh for each frame, instead a base mesh for a current time frame can be compared to a reconstructed quantized reference base mesh m'(i) (e.g., the base mesh the decoder will see from the previous time frame) and motion vectors to represent how the current base mesh has changed relative to the reference base mesh may be encoded in lieu of encoding a new base mesh for each frame. Note that the motion vectors may not be encoded directly but may be further compressed to take advantage of relationships between the motion vectors.

Figure 6:
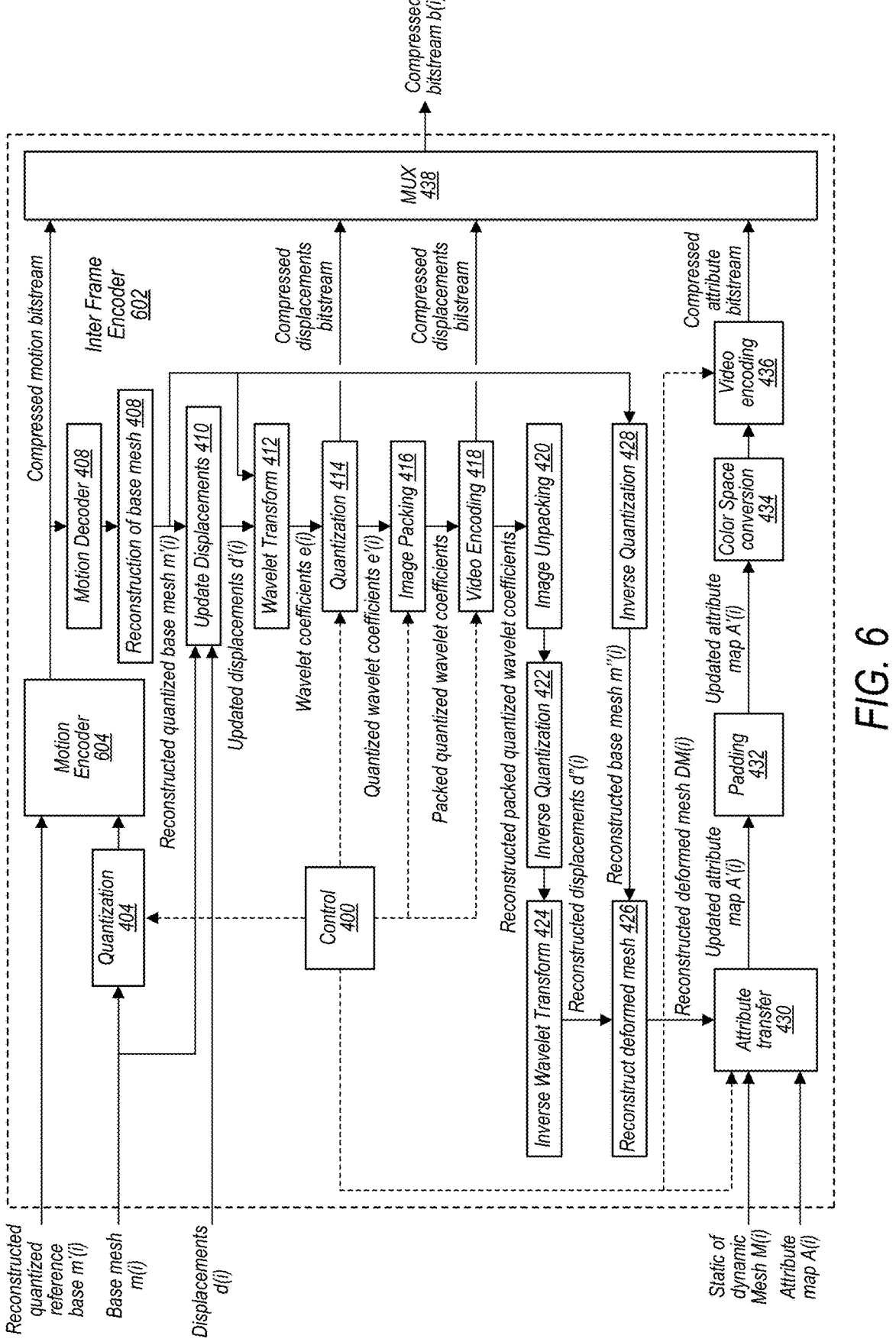
FIG. 6 illustrates a more-detailed view of an example inter-frame encoder, according to some embodiments.

The separated base mesh m(i) and displacements d(i) that have been separated by pre-processing module 302 are provided to encoder 304, which may be an intra-frame encoder as shown in FIG. 4 or an inter-frame encoder as shown in FIG. 6. Also, the attribute map A(i) is provided to the encoder 304. In some embodiments, the original static/dynamic mesh M(i) may also be provided to the encoder 304, in addition to the separated out base mesh m(i) and displacements d(i). For example, the encoder 304 may compare a reconstructed version of the static/dynamic mesh (that has been reconstructed from the base mesh m(i) and displacements d(i)) in order to determine geometric distortion. In some embodiments, an attribute transfer process may be performed to adjust the attribute values of the attribute images to account for this slight geometric distortion. In some embodiments, feedback may be provided back to pre-processing module 302, for example to reduce distortion, by changing how original static/dynamic mesh is decimated to generate the base mesh. Note that in some embodiments an intra-frame encoder and an inter-frame encoder may be combined into a single encoder that includes logic to toggle between intra-frame encoding and inter-frame encoding. The output of the encoder 304 is a compressed bit stream representing the original static/dynamic mesh and its associated attributes/textures.

With regard to mesh decimation, in some embodiments, a portion of a surface of a static/dynamic mesh may be thought of as an input 2D curve (represented by a 2D polyline), referred to as an "original" curve. The original curve may be first down-sampled to generate a base curve/polyline, referred to as a "decimated" curve. A subdivision scheme, such as those described herein, may then be applied to the decimated polyline to generate a "subdivided" curve. For instance, a subdivision scheme using an iterative interpolation scheme may be applied. The subdivision scheme may include inserting at each iteration a new point in the middle of each edge of the polyline. The inserted points represent additional vertices that may be moved by the displacements.

For example, the subdivided polyline is then deformed to get a better approximation of the original curve. More precisely, a displacement vector is computed for each vertex of the subdivided mesh such that the shape of the displaced curve approximates the shape of the original curve. An advantage of the subdivided curve is that it has a subdivision structure that allows efficient compression, while it offers a faithful approximation of the original curve. The compression efficiency is obtained thanks to the following properties:

The decimated/base curve has a low number of vertices and requires a limited number of bits to be encoded/transmitted.

The subdivided curve is automatically generated by the decoder once the base/decimated curve is decoded (e.g., no need to signal or hardcode at the decoder any information other than the subdivision scheme type and subdivision iteration count).

The displaced curve is generated by decoding and applying the displacement vectors associated with the subdivided curve vertices. Besides allowing for spatial/quality scalability, the subdivision structure enables efficient wavelet decomposition, which offers high compression performance (e.g., with respect to rate-distortion performance).

For example, FIG. 4 illustrates a more-detailed view of an example intra-frame encoder, according to some embodiments.

In some embodiments, intra-frame encoder 402 receives base mesh m(i), displacements d(i), the original static/dynamic mesh M(i) and attribute map A(i). The base mesh m(i) is provided to quantization module 404, wherein aspects of the base mesh may (optionally) be further quantized. In some embodiments, various mesh encoders may be used to encode the base mesh. Also, in some embodiments, intra-frame encoder 402 may allow for customization, wherein different respective mesh encoding schemes may be used to encode the base mesh. For example, static mesh encoder 406 may be a selected mesh encoder selected from a set of viable mesh encoder, such as a DRACO encoder (or another suitable encoder). The encoded base mesh, that has been encoded by static mesh encoder 406 is provided to multiplexer (MUX) 438 for inclusion in the compressed bitstream b(i). Additionally, the encoded base mesh is provided to static mesh decoder in order to generate a reconstructed version of the base mesh (that a decoder will see). This reconstructed version of the base mesh is used to update the displacements d(i) to take into account any geometric distortion between the original base mesh and a reconstructed version of the base mesh (that a decoder will see). For example, static mesh decoder 408 generates reconstructed quantized base mesh m'(i) and provides the reconstructed quantized base mesh m'(i) to displacement update module 410, which also receives the original base mesh and the original displacement d(i). The displacement update module 410 compares the reconstructed quantized base mesh m'(i) (that the decoder will see) to the base mesh m(i) and adjusts the displacements d(i) to account for differences between the base mesh m(i) and the reconstructed quantized base mesh m'(i). These updated displacements d'(i) are provided to wavelet transform 412 which applies a wavelet transformation to further compress the updated displacements d'(i) and outputs wavelet coefficients e(i), which are provided to quantization module 414 which generated quantized wavelet coefficients e'(i). The quantized wavelet coefficients may then be packed into a 2D image frame via image packing module 416, wherein the packed 2D image frame is further video encoded via video encoding 418. The encoded video images are also provided to multiplexer (MUX) 438 for inclusion in the compressed bit stream b(i). Also, in some embodiments, the displacement values (such as are indicated in the generated quantized wavelet coefficients e'(i) or indicated using other compression schemes) may be encoded at least partially outside of the video sub-bitstream, such as in their own displacement data sub-bitstream, in the base mesh sub-bitstream, or in an atlas data sub-bitstream.

In addition, in order to account for any geometric distortion introduced relative to the original static/dynamic mesh, an attribute transfer process 430 may be used to modify attributes to account for differences between a reconstructed deformed mesh DM(i) and the original static/dynamic mesh.

For example, video encoding 418 may further perform video decoding (or a complimentary video-decoding module may be used (which is not shown in FIG. 4)). This produces reconstructed packed quantized wavelet coefficients that are unpacked via image unpacking module 420. Furthermore, inverse quantization may be applied via inverse quantization module 422 and inverse wavelet transform 424 may be applied to generate reconstructed displacements d"(i). In some embodiments, other decoding techniques may be used to generate reconstructed displacements d"(i), such as decoding displacements signaled in atlas data sub-bitstream, a displacement data sub-bitstream, or the base mesh-sub-bitstream. Also, the reconstructed quantized base mesh m'(i) that was generated by static mesh decoder 408 may be inverse quantized via inverse quantization module 428 to generate reconstructed base mesh m"(i). The reconstructed deformed mesh generation module 426 applies the reconstructed displacements d"(i) to the reconstructed base mesh m"(i) to generate reconstructed deformed mesh DM(i). Note that the reconstructed deformed mesh DM(i) represents the reconstructed mesh that a decoder will generate, and accounts for any geometric deformation resulting from losses introduced in the encoding process.

Attribute transfer module 430 compares the geometry of the original static/dynamic mesh M(i) to the reconstructed deformed mesh DM(i) and updates the attribute map to account for any geometric deformations, this updated attribute map is output as updated attribute map A'(i). The updated attribute map A'(i) is then padded, wherein a 2D image comprising the attribute images is padded such that spaces not used to communicate the attribute images have a padding applied. In some embodiments, a color space conversion is optionally applied at color space conversion module 434. For example, an RGB color space used to represent color values of the attribute images may be converted to a YCbCr color space, also color space sub-sampling may be applied such as 4:2:0, 4:0:0, etc. color space sub-sampling. The updated attribute map A'(i) that has been padded and optionally color space converted is then video encoded via video encoding module 436 and is provided to multiplexer 438 for inclusion in compressed bitstream b(i).

In some embodiments, a controller 400 may coordinate the various quantization and inverse quantization steps as well as the video encoding and decoding steps such that the inverse quantization "undoes" the quantization and such that the video decoding "undoes" the video encoding. Also, the attribute transfer module 430 may take into account the level of quantization being applied based on communications from the controller 400.

FIG. 5 illustrates an example intra-frame decoder for decoding a three-dimensional mesh, according to some embodiments.

Intra frame decoder 502 receives a compressed bitstream b(i), such as the compressed bit stream generated by the intra frame encoder 402 shown in FIG. 4. Demultiplexer (DE-MUX) 504 parses the bitstream into a base mesh sub-component, a displacement inverse sub-component, and an attribute map sub-component. In some embodiments, the displacement sub-component may be signaled in a displacement data sub-bitstream or may be at least partially signaled in other sub-bitstreams, such as an atlas data sub-bitstream, a base mesh sub-bitstream, or a video sub-bitstream. In such a case, displacement decoder 522 decodes the displacement sub-bitstream and/or atlas decoder 524 decodes the atlas sub-bitstream.

Static mesh decoder 506 decodes the base mesh sub-component to generate a reconstructed quantized base mesh m'(i), which is provided to inverse quantization module 518, which in turn outputs decoded base mesh m"(i) and provides it to reconstructed deformed mesh generator 520.

In some embodiments, a portion of the displacement sub-component of the bit stream is provided to video decoding 508, wherein video encoded image frames are video decoded and provided to image unpacking 510. Image unpacking 510 extracts the packed displacements from the video decoded image frame and provides them to inverse quantization 512 wherein the displacements are inverse quantized. Also, the inverse quantized displacements are provided to inverse wavelet transform 514, which outputs decoded displacements d"(i). Reconstructed deformed mesh generator 520 applies the decoded displacements d"(i) to the decoded base mesh m"(i) to generate a decoded static/dynamic mesh M"(i). The decoded displacement may come from any combination of the video sub-bitstream, the atlas data sub-bitstream, the base-mesh sub-bitstream and/or a displacement data sub-bitstream. Also, the attribute map sub-component is provided to video decoding 516, which outputs a decoded attribute map A"(i). A reconstructed version of the three-dimensional visual content can then be rendered at a device associated with the decoder using the decoded mesh M" (i) and the decoded attribute map A" (i).

As shown in FIG. 5, a bitstream is de-multiplexed into three or more separate sub-streams:

mesh sub-stream, displacement sub-stream for positions and potentially for each vertex attribute, and attribute map sub-stream for each attribute map.

The mesh sub-stream is fed to the mesh decoder to generate the reconstructed quantized base mesh m'(i). The decoded base mesh m"(i) is then obtained by applying inverse quantization to m'(i). The proposed scheme is agnostic of which mesh codec is used. The mesh codec used could be specified explicitly in the bitstream or could be implicitly defined/fixed by the specification or the application.

The displacement sub-stream could be decoded by a video/image decoder. The generated image/video is then un-packed and inverse quantization is applied to the wavelet coefficients. In an alternative embodiment, the displacements could be decoded by dedicated displacement data decoder or the atlas decoder. The proposed scheme is agnostic of which codec/standard is used. Image/video codecs such as [HEVC][AVC][AV1][AV2][JPEG][JPEG2000] could be used. The motion decoder used for decoding mesh motion information or a dictionary-based decoder such as ZIP could be for example used as the dedicated displacement data decoder. The decoded displacement d"(i) is then generated by applying the inverse wavelet transform to the unquantized wavelet coefficients. The final decoded mesh is generated by applying the reconstruction process to the decoded base mesh m"(i) and adding the decoded displacement field d"(i).

The attribute sub-stream is directly decoded by the video decoder and the decoded attribute map A"(i) is generated as output. The proposed scheme is agnostic of which codec/standard is used. Image/video codecs such as [HEVC][AVC][AV1][AV2][JPEG][JPEG2000] could be used. Alternatively, an attribute sub-stream could be decoded by using non-image/video decoders (e.g., using a dictionary-based decoder such as ZIP). Multiple sub-streams, each associated with a different attribute map, could be decoded. Each sub-stream could use a different codec.

FIG. 6 illustrates a more-detailed view of an example inter-frame encoder, according to some embodiments.

In some embodiments, inter frame encoder 602 may include similar components as the intra-frame encoder 402, but instead of encoding a base mesh, the inter-frame encoder may encode motion vectors that can be applied to a reference mesh to generate, at a decoder, a base mesh.

For example, in the case of dynamic meshes, a temporally consistent re-meshing process is used, which may produce a same subdivision structure that is shared by the current mesh M'(i) and a reference mesh M'(j). Such a coherent temporal re-meshing process makes it possible to skip the encoding of the base mesh m(i) and re-use the base mesh m(j) associated with the reference frame M(j). This could also enable better temporal prediction for both the attribute and geometry information. More precisely, a motion field f(i) describing how to move the vertices of m(j) to match the positions of m(i) may be computed and encoded. Such process is described in FIG. 6. For example, motion encoder 406 may generate the motion field f(i) describing how to move the vertices of m(j) to match the positions of m(i).

In some embodiments, the base mesh m(i) associated with the current frame is first quantized (e.g., using uniform quantization) and encoded by using a static mesh encoder. The proposed scheme is agnostic of which mesh codec is used. The mesh codec used could be specified explicitly in the bitstream by encoding a mesh codec ID or could be implicitly defined/fixed by the specification or the application.

Depending on the application and the targeted bitrate/visual quality, the encoder could optionally encode a set of displacement vectors associated with the subdivided mesh vertices, referred to as the displacement field d(i).

The reconstructed quantized base mesh m'(i) (e.g., output of reconstruction of base mesh 408) is then used to update the displacement field d(i) (at update displacements module 410) to generate an updated displacement field d'(i) so it takes into account the differences between the reconstructed base mesh m'(i) and the original base mesh m(i). By exploiting the subdivision surface mesh structure, a wavelet transform is then applied, at wavelet transform 412, to d'(i) and a set of wavelet coefficients are generated. The wavelet coefficients are then quantized, at quantization module 414, packed into a 2D image/video (at image packing 416), and compressed by using an image/video encoder (at video encoding 418). The encoding of the wavelet coefficients may be lossless or lossy. The reconstructed version of the wavelet coefficients is obtained by applying image unpacking and inverse quantization to the reconstructed wavelet coefficients video generated during the video encoding process (e.g., at 420, 422, and 424). Reconstructed displacements d"(i) are then computed by applying the inverse wavelet transform to the reconstructed wavelet coefficients. A reconstructed base mesh m"(i) is obtained by applying inverse quantization to the reconstructed quantized base mesh m'(i). The reconstructed deformed mesh DM(i) is obtained by subdividing m"(i) and applying the reconstructed displacements d"(i) to its vertices.

Since the quantization step or/and the mesh compression module may be lossy, a reconstructed quantized version of m(i), denoted as m'(i), is computed. If the mesh information is losslessly encoded and the quantization step is skipped, m(i) would exactly match m'(i).

As shown in FIG. 6, a reconstructed quantized reference base mesh m'(j) is used to predict the current frame base mesh m(i). The pre-processing module 302 described in FIG. 3 could be configured such that m(i) and m(j) share the same:

number of vertices,
    connectivity,
    texture coordinates, and
    texture connectivity.

The motion field f(i) is computed by considering the quantized version of m(i) and the reconstructed quantized base mesh m'(j). Since m'(j) may have a different number of vertices than m(j) (e.g., vertices may get merged/removed), the encoder keeps track of the transformation applied to m(j) to get m'(j) and applies it to m(i) to guarantee a 1-to-1 correspondence between m'(j) and the transformed and quantized version of m(i), denoted m*(i). The motion field f(i) is computed by subtracting the quantized positions p(i, v) of the vertex v of m*(i) from the positions p(j, v) of the vertex v of m'(j):

$$f(i, v) = p(i, v) - p(j, v)$$

The motion field is then further predicted by using the connectivity information of m'(j) and is entropy encoded (e.g., context adaptive binary arithmetic encoding could be used).

Since the motion field compression process could be lossy, a reconstructed motion field denoted as f'(i) is computed by applying the motion decoder module 408. A reconstructed quantized base mesh m'(i) is then computed by adding the motion field to the positions of m'(j). The remaining of the encoding process is similar to the Intra frame encoding.

Figure 7:
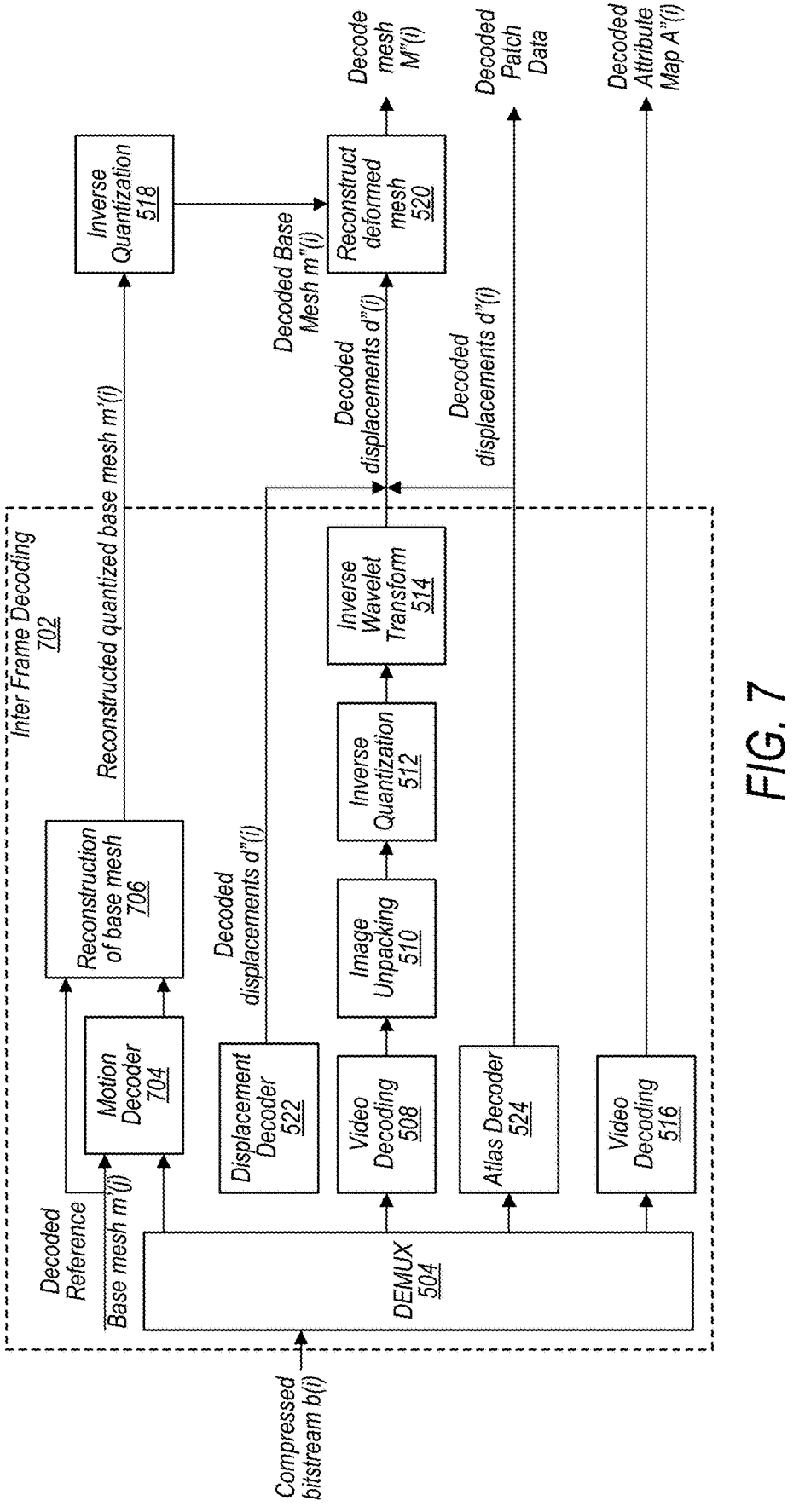
FIG. 7 illustrates an example inter-frame decoder for decoding a three-dimensional mesh, according to some embodiments.

FIG. 7 illustrates an example inter-frame decoder for decoding a three-dimensional mesh, according to some embodiments.

Inter frame decoder 702 includes similar components as intra frame decoder 502 shown in FIG. 5. However, instead of receiving a directly encoded base mesh, the inter frame decoder 702 reconstructs a base mesh for a current frame based on motion vectors of a displacement field relative to a reference frame. For example, inter-frame decoder 702 includes motion field/vector decoder 704 and reconstruction of base mesh module 706.

In a similar manner to the intra-frame decoder, the inter-frame decoder 702 separates the bitstream into three separate sub-streams:

a motion sub-stream,
    a displacement sub-stream, and
    an attribute sub-stream.

The motion sub-stream is decoded by applying the motion decoder 704. The proposed scheme is agnostic of which codec/standard is used to decode the motion information. For instance, any motion decoding scheme could be used. The decoded motion is then optionally added to the decoded reference quantized base mesh m'(j) to generate the reconstructed quantized base mesh m'(i), i.e., the already decoded mesh at instance j can be used for the prediction of the mesh at instance i. Afterwards, the decoded base mesh m"(i) is generated by applying the inverse quantization to m'(i).

The displacement and attribute sub-streams are decoded in a similar manner as in the intra frame decoding process described with regard to FIG. 5. The decoded mesh M"(i) is also reconstructed in a similar manner.

The inverse quantization and reconstruction processes are not normative and could be implemented in various ways and/or combined with the rendering process.

Divisions of the Mesh and Controlling Encoding to Avoid Cracks

In some embodiments, the mesh may be sub-divided into a set of patches (e.g., sub-parts) and the patches may potentially be grouped into groups of patches, such as a set of patch groups/tiles. In such embodiments, different encoding parameters (e.g., subdivision, quantization, wavelets transform, coordinates system . . . ) may be used to compress each patch or patch group. In some embodiments, in order to avoid cracks at patch boundaries, lossless coding may be used for boundary vertices. Also, quantization of wavelet coefficients for boundary vertices may be disabled, along with using a local coordinate system for boundary vertices.

In some embodiments, scalability may be supported at different levels. For example, temporal scalability may be achieved through temporal sub-sampling and frame re-ordering. Also, quality and spatial scalability may be achieved by using different mechanisms for the geometry/ vertex attribute data and the attribute map data. Also, region of interest (ROI) reconstruction may be supported. For example, the encoding process described in the previous sections could be configured to encode an ROI with higher resolution and/or higher quality for geometry, vertex attribute, and/or attribute map data. This is particularly useful to provide a higher visual quality content under tight bandwidth and complexity constraints (e.g., higher quality for the face vs rest of the body). Priority/importance/spatial/bounding box information could be associated with patches, patch groups, tiles, network abstraction layer (NAL) units, and/or sub-bitstreams in a manner that allows the decoder to adaptively decode a subset of the mesh based on the viewing frustum, the power budget, or the terminal capabilities. Note that any combination of such coding units could be used together to achieve such functionality. For instance, NAL units and sub-bitstreams could be used together.

In some embodiments, temporal and/or spatial random access may be supported. Temporal random access could be achieved by introducing IRAPs (Intra Random Access Points) in the different sub-streams (e.g., attribute atlas, video, mesh, motion, and displacement sub-streams). Spatial random access could be supported through the definition and usage of tiles, sub-pictures, patch groups, and/or patches or any combination of these coding units. Metadata describing the layout and relationships between the different units could also need to be generated and included in the bitstream to assist the decoder in determining the units that need to be decoded.

As discussed above, various functionalities may be supported, such as:

Spatial random access,

Adaptive quality allocation (e.g., foveated compression like allocating higher quality to the face vs. the body of a human model), Region of Interest (ROI) access, Coding unit level metadata (e.g., object descriptions, bounding box information), Spatial and quality scalability, and Adaptive streaming and decoding (e.g., stream/decode high priority regions first).

The disclosed compression schemes allow the various coding units (e.g., patches, patch groups and tiles) to be compressed with different encoding parameters (e.g., subdivision scheme, subdivision iteration count, quantization parameters, etc.), which can introduce compression artefacts (e.g., cracks between patch boundaries). In some embodiments, as further discussed below an efficient (e.g., computational complexity, compression efficiency, power consumption, etc. efficient) strategy may be used that allows the scheme to handle different coding unit parameters without introducing artefacts.

Mesh Tile

Figure 8A:
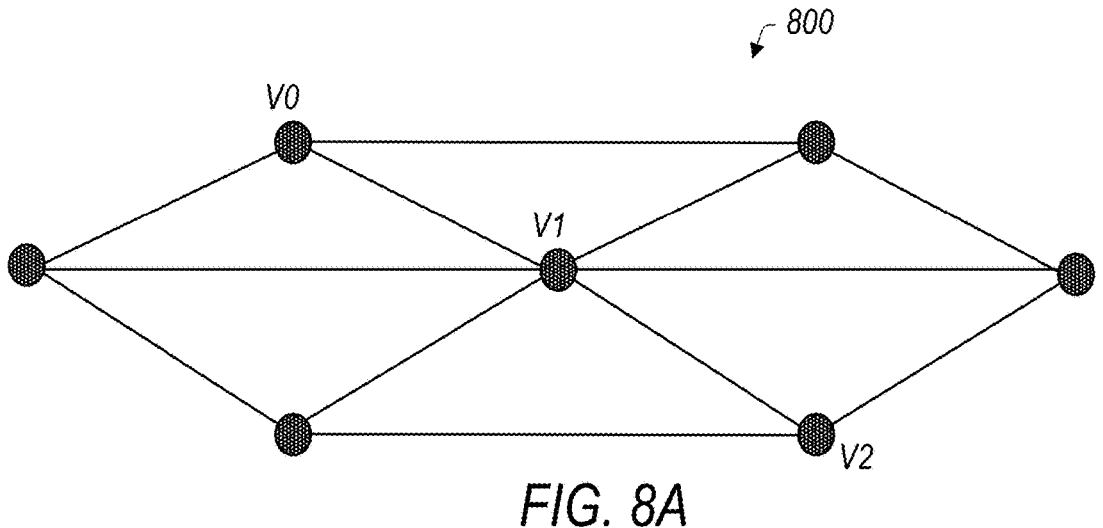
FIGS. 8A-8B illustrate segmentation of a mesh into multiple tiles, according to some embodiments.
Figure 8B:
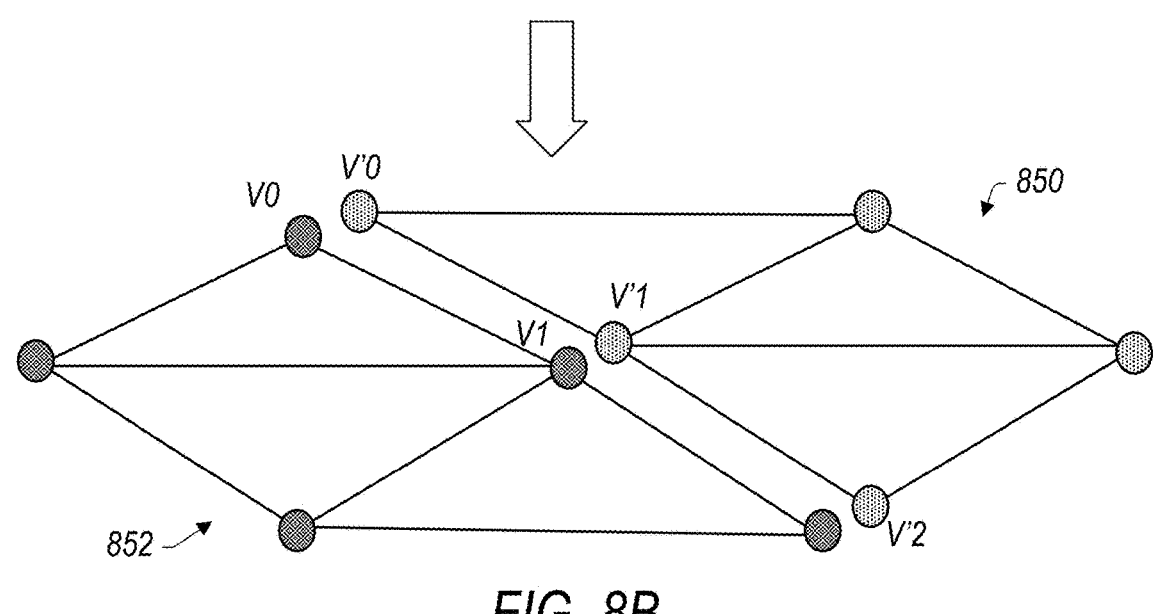

A mesh could be segmented into a set of tiles (e.g., parts/segments), which could be encoded and decoded independently. Vertices/edges that are shared by more than one tile are duplicated as illustrated in FIGS. 8A/8B. Note that mesh 800 is split into two tiles 850 and 852 by duplicating the three vertices {V0, V1, V2}, and the two shared edges {(V0, V1), (V1, V2)}. Said another way, when a mesh is divided into two tiles each of the two tiles include vertices and edges that were previous one set of vertices and edges in the combined mesh, thus the vertices and edges are duplicated in the tiles.

Sub Mesh

Figure 9:
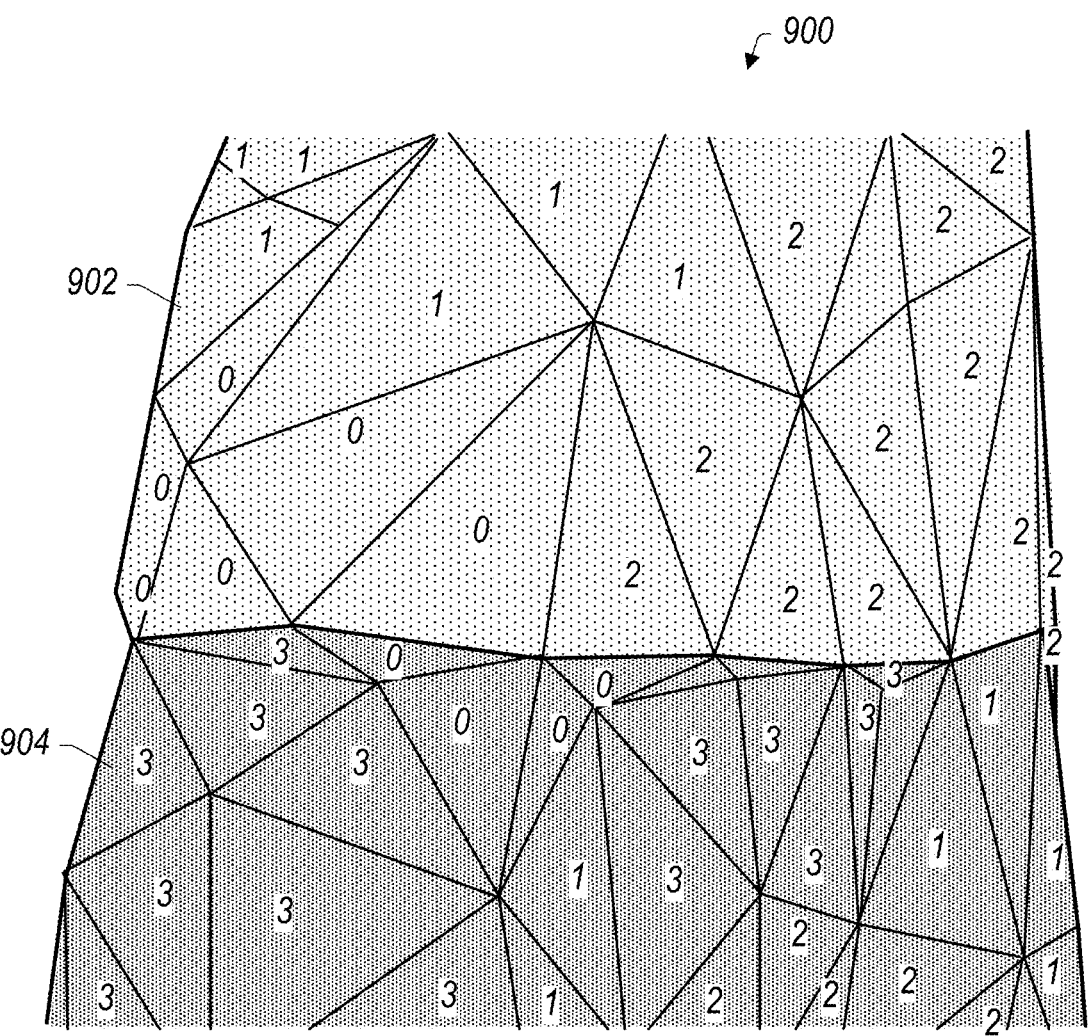
FIG. 9 illustrates a mesh segmented into two tiles, each comprising sub-meshes, according to some embodiments.

Each tile could be further segmented into a set of sub-meshes, which may be encoded while exploiting dependencies between them. For example, FIG. 9 shows an example of a mesh 900 segmented into two tiles (902 and 904) containing three and four sub-meshes, respectively. For example, tile 902 includes sub-meshes 0, 1, and 2; and tile 904 includes sub-meshes 0, 1, 2, and 3.

The sub-mesh structure could be defined either by:

Explicitly encoding a per face integer attribute that indicates for each face of the mesh the index of the sub-mesh it belongs to, or Implicitly detecting the connected components (CC) of the mesh with respect to the position's connectivity or the texture coordinate's connectivity or both and by considering each CC as a sub-mesh. The mesh vertices are traversed from neighbor to neighbor, which makes it possible to detect the CCs in a deterministic way. The indices assigned to the CCs start from 0 and are incremented by one each time a new CC is detected.

Patch

A Patch is a set of sub-meshes. An encoder may explicitly store for each patch the indices of the sub-meshes that belongs to it. In a particular embodiment, a sub-mesh could belong to one or multiple patches (e.g., associate metadata with overlapping parts of the mesh). In another embodiment, a sub-mesh may belong to only a single patch. Vertices located on the boundary between patches are not duplicated. Patches are also encoded while exploiting correlations between them and therefore, they cannot be encoded/decoded independently.

The list of sub-meshes associated with a patch may be encoded by using various strategies, such as:

Entropy coding

Intra-frame prediction

Inter-frame prediction

Local sub-mesh indices (i.e., smaller range)

Patch Group

A patch group is a set of patches. A patch group is particularly useful to store parameters shared by its patches or to allow a unique handle that could be used to associate metadata with those patches.

In some embodiments, in order to support using different encoding parameters per patch, the following may be used:

The relationship between sub-meshes and patches may be exploited such that each face of the base mesh is assigned a patch ID.

Vertices and edges belonging to a single sub-mesh are assigned the patch ID the sub-mesh belongs to.

Vertices and edges located on the boundary of two or multiple patches are assigned to all the corresponding patches.

When applying the subdivision scheme, the decision to subdivide an edge or not is made by considering the subdivision parameters of all the patches the edge belongs to.

Figures 11A, 11B, 11C:
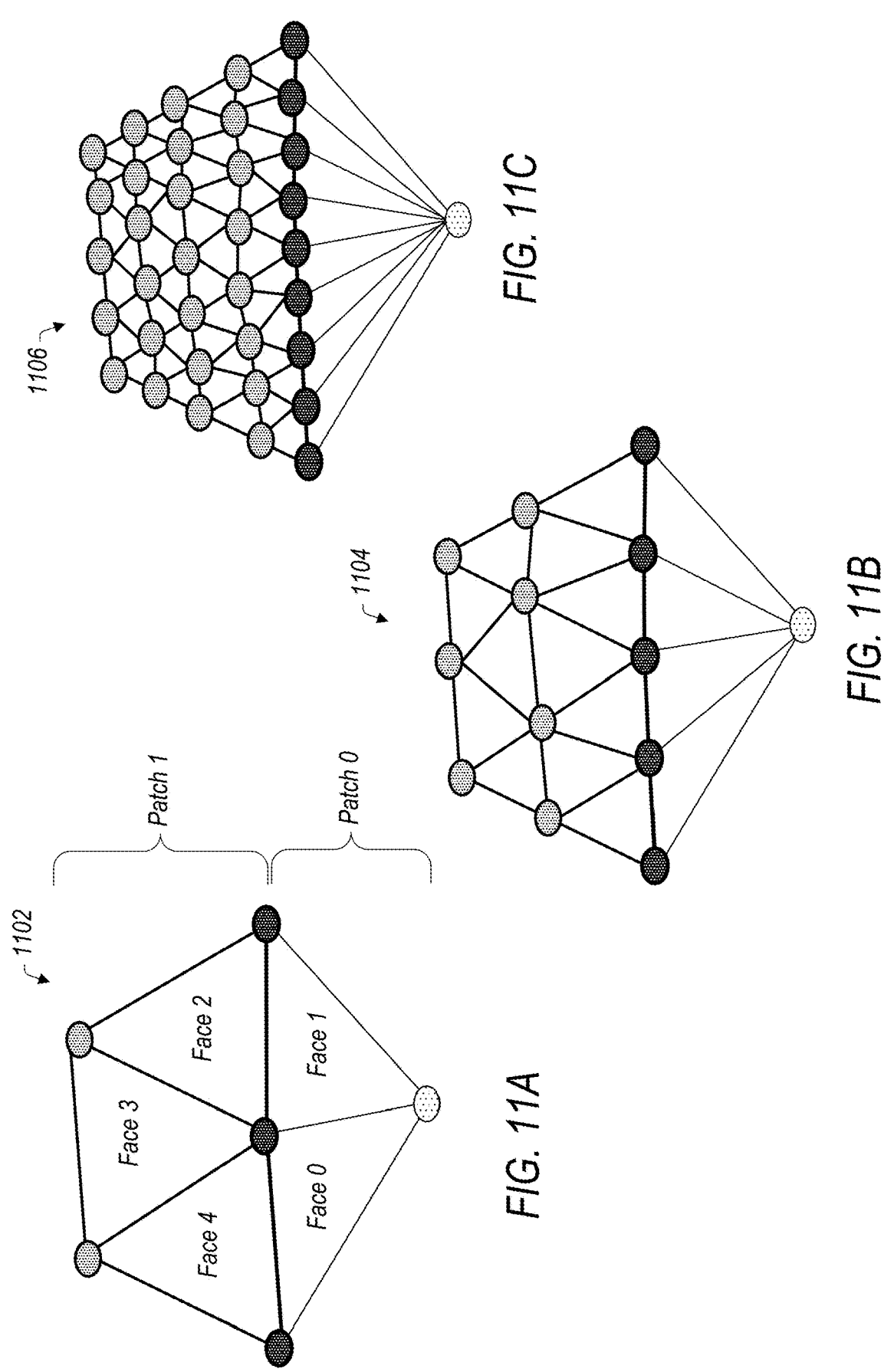
FIGS. 11A-11C illustrate adaptive sub-division for adjacent patches, wherein shared edges are sub-divided in a way that ensures vertices of adjacent patches align with one another, according to some embodiments.

For example, FIGS. 11A-11C illustrate adaptive subdivision based on shared edges. Based on the subdivision decisions as determined in FIGS. 11A-11C (e.g., suppose that there is an edge that belongs to two patches Patch0 and Patch1, Patch0 has a subdivision iteration count of 0, Patch1 has a subdivision iteration count of 2. The shared edge will be subdivided 2 times (i.e., take the maximum of the subdivision counts)), the edges are sub-divided using the sub-division scheme shown in FIGS. 10A-10D. For example, based on the subdivision decisions associated with the different edges, the a given one of the adaptive subdivision schemes described in FIGS. 10A-10D is applied.

FIGS. 10A-10D show how to subdivide a triangle when 3, 2, 1, or 0 of its edges should be subdivided, respectively. Vertices created after each subdivision iteration are assigned to the patches of their parent edge.

When applying quantization to the wavelet coefficients, the quantization parameters used for a vertex are selected based on the quantization parameters of all the patches the vertex belongs to. For example, suppose that a patch belongs to two patches, Patch0 and Patch1. Patch0 has a quantization parameter QP1. Patch1 has a quantization parameter QP2. The wavelet coefficients associated with the vertex will be quantized using the quantization parameter QP=min(QP1, QP2).

Mesh Tiles

To support mesh tiles, the encoder could partition the mesh into a set of tiles, which are then encoded/decoded independently by applying any mesh codec or use a mesh codec that natively supports tiled mesh coding.

In both cases, the set of shared vertices located on tile boundaries are duplicated. To avoid cracks appearing between tiles, the encoder could either:

Encode stitching information indicating the mapping between duplicated vertices as follows:

Encode per vertex tags identifying duplicated vertices (by encoding a vertex attribute with the mesh codec)

Encode for each duplicated vertex the index of the vertex it should be merged with.

Make sure that the decoded positions and vertex attributes associated with the duplicated vertices exactly match Per vertex tags identifying duplicated vertices and code this information as a vertex attribute by using the mesh codec Apply an adaptive subdivision scheme as described in the previous section to guarantee a consistent subdivision behavior on tile boundaries The encoder needs to maintain the mapping between duplicated vertices and adjust the encoding parameters to guarantee matching values Encode the duplicated vertex positions and vertex attribute values in a lossless manner Disable wavelet transform (transform bypass mode)

Perform a search in the encode parameter space to determine a set of parameters that are encoded in the bitstream and guarantee matching positions and attribute values Do nothing The decoder would decompress the per vertex tag information to be able to identify the duplicated vertices. If different encoding parameters were signaled by the encoder for the duplicated vertices compared to non-duplicated ones, the decoder should adaptively switch between the set of two parameters based on the vertex type (e.g., duplicated vs. non-duplicated).

The decoder could apply smoothing and automatic stitching as a post processing based on signaling provided by the encoder or based on the analysis on the decoded meshes. In a particular embodiment, a flag is included per vertex or patch to enable/disable such post-processing. This flag could be among others:

signaled as an SEI message, encoded with the mesh codec, or signaled in the atlas sub-bitstream.

In another embodiment, the encoder could duplicate regions of the mesh and store them in multiple tiles. This could be done for the purpose of:

Error resilience,

Guard bands, and

Seamless/adaptive streaming.

Example Schemes for Signaling Displacement Information

Figure 12:
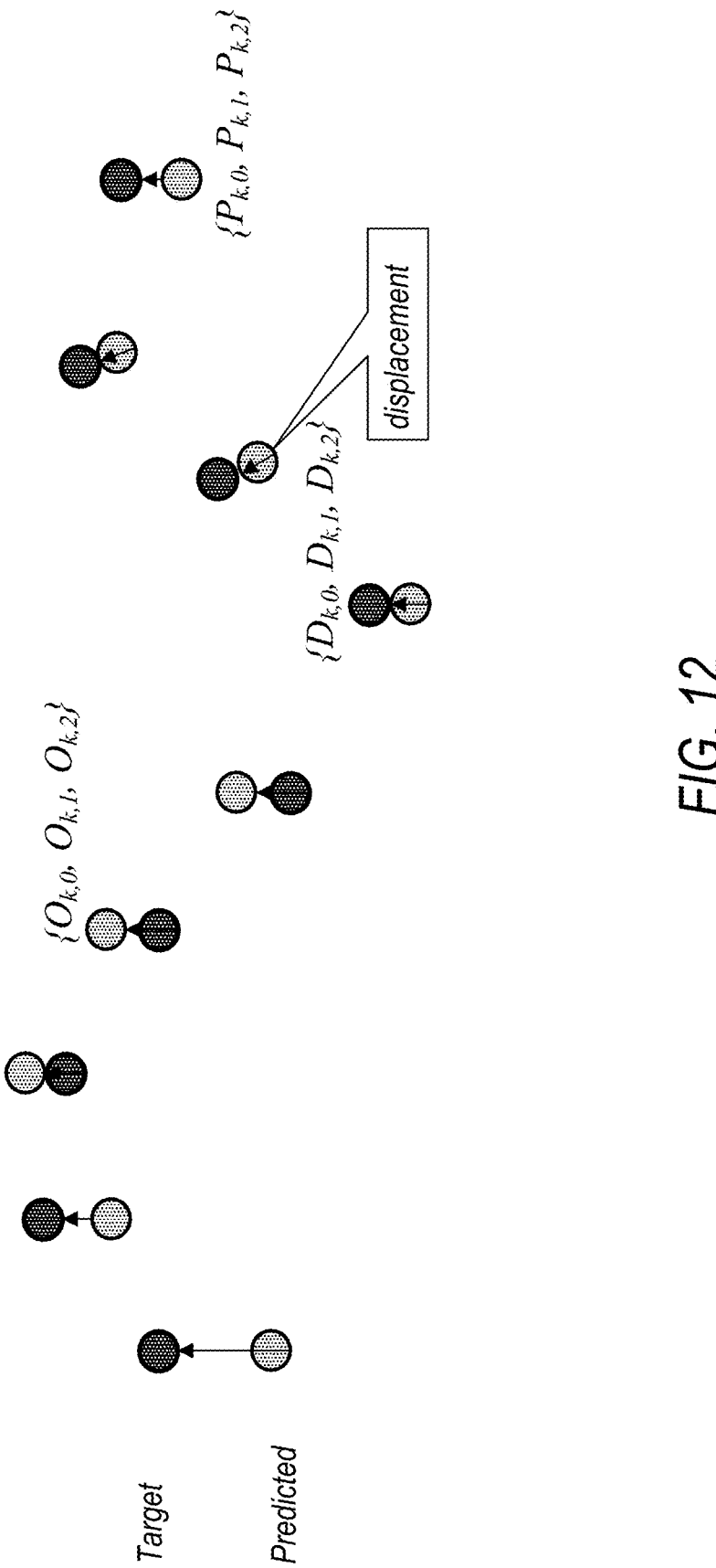
FIG. 12 illustrates examples of displacements being applied to sub-division locations to adjust vertex locations, according to some embodiments.

As discussed above, displacement information indicates the spatial difference between the vertices in a target mesh and a predicted mesh, such as may be predicted by sub-dividing a base mesh. As further described herein, the numbers of vertices in the target mesh and in the predicted mesh are the same and the vertices are perfectly matched. The displacement data can be signaled as is, i.e., as a difference between the target and the predicted meshes. Alternatively, the displacement data can be mathematically transformed. The transformed coefficients can be coded and signaled in a similar manner as described above. The difference data, regardless it is transformed or not, can be signaled using a video sub-bitstream. Alternatively, this information can be signaled through another separate and dedicated data sub-bitstream, referred to as the Displacement Sub-bitstream. In another scenario, this information can be signaled using the Atlas data sub-bitstream, e.g., as a part of the mesh patch data information. Also, the displacement information may be signaled in the base-mesh sub-bitstream. For example, FIG. 12 illustrates the application of displacements (such as are signaled in the displacement information) to predicted vertices locations, such as may be predicted by sub-dividing a base mesh, to re-locate the vertices to target locations that better match an initial version of volumetric visual content that is being (or has been) compressed.

When the total number of vertices of the target and the predicted is N, the vertex positions in the target mesh is $\vec{O}v=\{\vec{O}_{v0}, \vec{O}_{v1}, \vec{O}_{v3} \ldots \vec{O}_{vn-1}\}$ with $\vec{O}_{vk}=\{O_{k,0}, O_{k,1}, O_{k,2}\}$, and the vertex positions in the predicted mesh is $\vec{P}v=\{\vec{P}_{v0}, \vec{P}_{v1}, \vec{P}_{v2}, \vec{P}_{v3} \ldots \vec{P}_{vN-1}\}$ with $\vec{P}_{vk}=\{P_{k,0}, P_{k,1}, P_{k,2}\}$, the displacement value of a vertex k is as follows:

$$D_{vk}=\{D_{k,0},D_{k,1},D_{k,2}\}=\{(O_{k,0}-P_{k,0},O_{k,1}-P_{k,1},O_{k,2}-P_{k,2}\}$$

At the encoder side, the displacement data $\vec{D}v=\{\vec{D}_{v0}, \vec{D}_{v1}, \vec{D}_{v2}, \ldots, \vec{D}_{vN-1}\}$ can be transformed by a transform method, such as the wavelet transform, into $\vec{C}v=\{\vec{C}_{v0}, \vec{C}_{v1}, \vec{C}_{v2}, \ldots, \vec{C}_{vN-1}\}$. In the case that the displacement data is not transformed, $\vec{C}v \vec{D}v$. The transformed data can be, then, quantized.

After quantization (if applied), $\vec{C}v$ can be placed onto an image. Each entry of $\vec{C}_{vk}$, $\{C_{k,0}, C_{k,1}, C_{k,2}\}$, corresponding to the $\{X,Y,Z\}$ coordinates in the 3D space, can be placed on a different image plane. For example, the first entries, $\{C_{0,0}, C_{1,0}, C_{2,0}, \ldots C_{N-1,0}\}$ are placed on the Y plane and the second entries, $\{C_{0,1}, C_{1,1}, C_{2,1} \ldots C_{N-1,1}\}$ and the third entries, $\{C_{0,2}, C_{1,2}, C_{2,2} \ldots C_{N-1,2}\}$ are placed on the U plane and the V plane, respectively.

In another embodiment, the entries of $\vec{C}v$ can be placed onto the 3 planes of an image with different granularity. For example, each value of the first entries, $\{C_{0,0}, C_{1,0}, C_{2,0}, \ldots C_{N-1,0}\}$ are placed multiple times on the Y plane while the values of the other entries placed once on the respective plane. This multiple placement considers the following chroma plane scaling for the chroma format change. In another embodiment, 0 can be used instead of duplicating the first entries. For example, FIG. 13 illustrates three color planes of a video image frame, such as the Y plane, U plane, and V plane, as well as sub-sampling (e.g., a 4:2:0 chroma format), wherein the coefficients (resulting from applying a wavelet transform to the displacements) are signaled, in the respective color planes to signal coefficients for displacement motion in multiple direction, such as X, Y, and Z. For example, a coefficient for X displacement may be signaled in the Y plane, a coefficient for Y displacement may be signaled in the U plane, and a coefficient for Z displacement may be signaled in the V plane. In the notation used, the first digit after "C" may indicate an index value of the displacement, e.g., the first displacement, the second displacement, etc. The last digit may indicate the displacement component, for example zero may indicate movement in the X-direction, one may indicate movement in the Y-direction, and two may indicate movement in the Z-direction, as a few examples.

In another embodiment, the values can be placed on one plane consecutively. In this case, after all the first entries are placed on a plane, then all the second entries follow. Then all the third entries are placed on the same plane. Conceptually, when the image resolution is W×H, the first entry of the coefficient value of vertex k, $(C_{k,0})$ can be placed on (k/W, k % W). The second entry of the coefficient value of vertex k, $(C_{k,1})$ can be placed on ((N+k)/W, (N+k) % W) and then the first entry of the coefficient value of vertex k,$(C_{k,2})$ can be placed on ((2N+k)/W, (2N+k) % W).

In another embodiment, the values can be placed on one plane interleaved. In this case, the 3 values of a vertex are placed consecutively then the 3 values of next vertex follow on the same plane. Conceptually, when the image resolution is W×H, the first entry of the coefficient value of vertex k, $(C_{k,0})$ can be placed on (3k/W, 3k % W). The second entry of the coefficient value of vertex k, $(C_{k,1})$ can be placed on ((3k+1)/W, (3k+1)% W) and then the first entry of the coefficient value of vertex k,$(C_{k,2})$ can be placed on ((3k+2)/W, (3k+2)% W).

In another embodiment, the coefficients can be placed in various orders. Instead of being placed in the raster order, they can be placed in the zig-zag order, the vertical first order, the horizontal first order, diagonal up order or diagonal down order. This order can be signaled in the bitstream.

Figure 14:
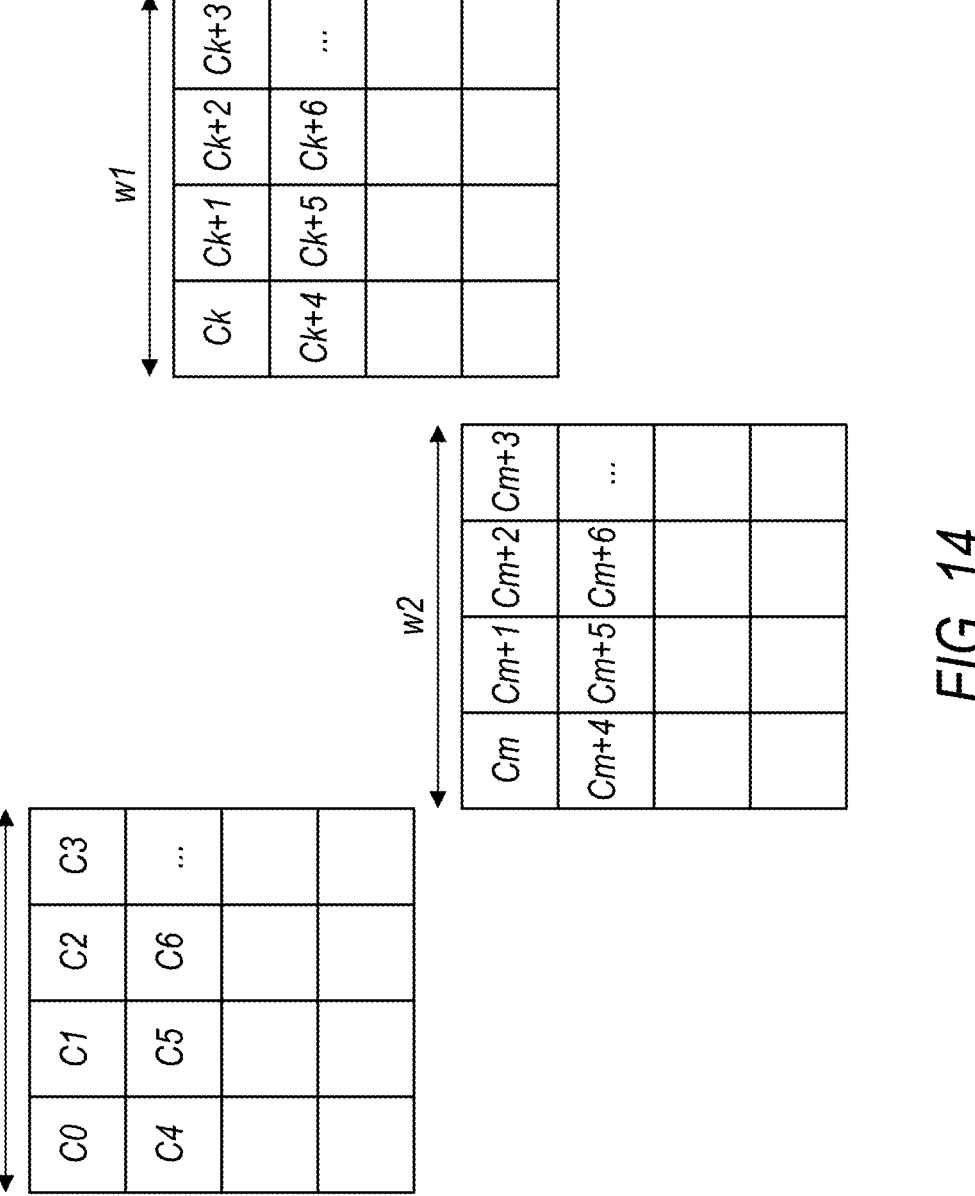
FIG. 14 illustrates example patches that may be included in a video sub-bitstream to signal displacement values, according to some embodiments.

In another embodiment, the values can be placed on a restricted area, e.g., a block in an image. In this case, the W value corresponds to the width of the block. FIG. 14 shows an example of block based $\vec{C}v$ placement.

Also described above is the concept of a sub-mesh and patch and how to signal them. The sub-mesh is an independently decodable subpart of a mesh. The patch is a set of triangles in a subpart that share the same transform/subdivision information and whose coefficient data is signaled together. In some embodiments, the number of coefficients for a patch is the same as the vertices represented by the patch.

Figure 15:
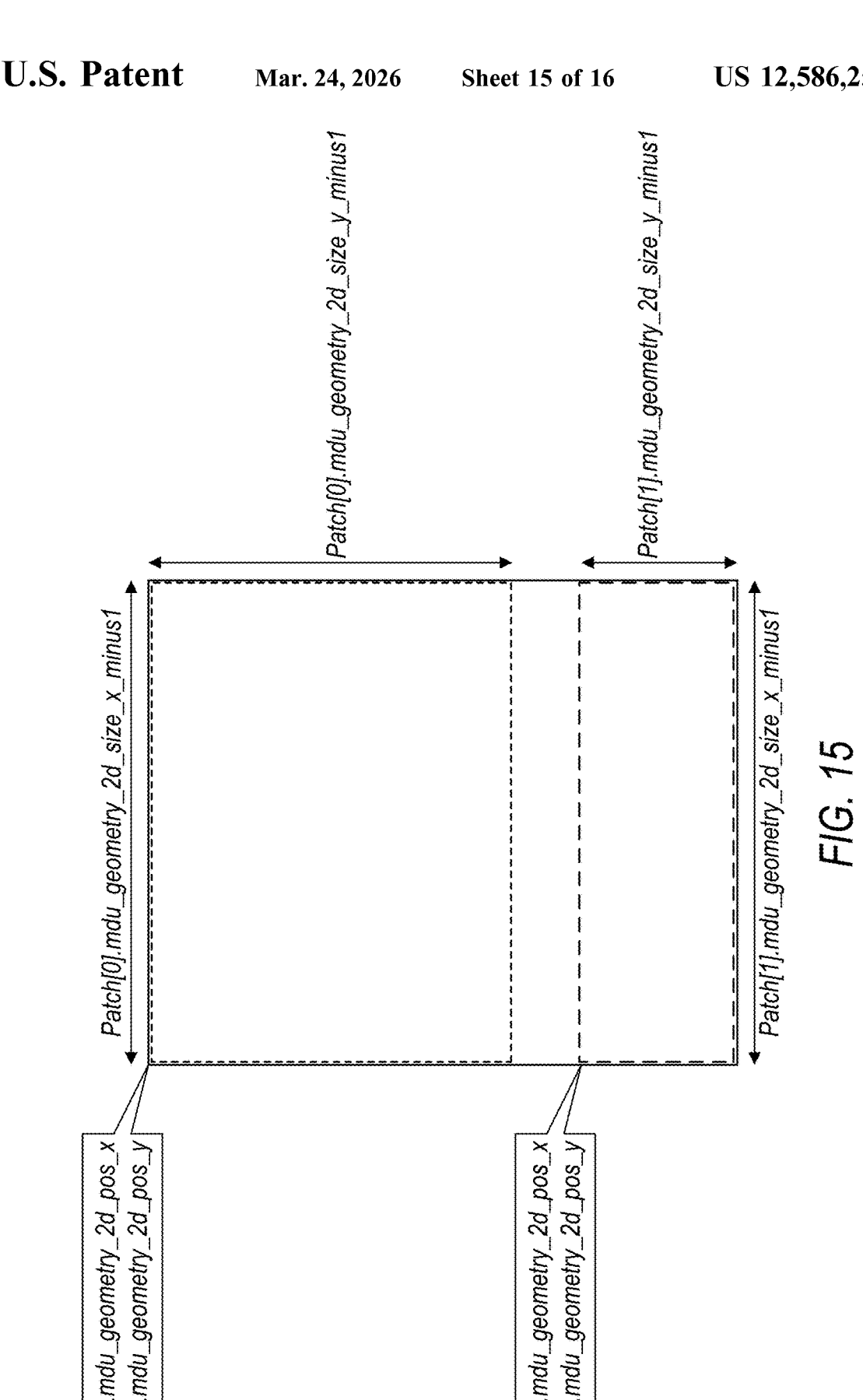
FIG. 15 illustrates examples of how patch size and location in a video frame of a video sub-bitstream may be signaled, according to some embodiments.

In some embodiments, the coefficient values for each patch can be placed in different areas of a video image frame, for example as shown in FIG. 15.

Displacement Data in the Atlas Sub-Bitstream

Since the coefficient data may be bound to a patch, the corresponding coefficients can be signaled in the patch. This may guarantee partial decoding and also random access of the decoded meshes can be achieved. The patch structure also gives the functionality of inter-prediction. For example, at the end of the patch data for V-DMC, within the structures mesh_intra_data_unit, mesh_inter_data_unit and mesh_merge_data_unit, the size of the coefficient data and the set of coefficients can be signaled. An example of the signaling mechanism is as follows:

| | descriptor |
|---|---|
| mesh__intra__data__unit( tileID, patchIdx ) { | |
| ... | |
|   mdu__coefficient__size[ tileID ][ patchIdx ] | ue(v) |
|   for( j = 0; j < mdu__coefficient__size; j++ ) { | |
|     mdu__coefficient__byte | u(8) |
|   } | |
| } | |

In another embodiment, signaling of coefficients in the patch data can be controlled by a flag in the corresponding Atlas Frame Parameter set. In the following example, a flag, afps_patch_coefficient_signal_enable_flag, which is signaled in the corresponding Atlas Frame Parameter set, indicates that the size of the coefficient data (mdu_coefficient_size) is signaled or inferred as 0. For example:

| | descriptor |
|---|---|
| mesh__intra__data__unit( tileID, patchIdx ) { | |
| ... | |
|   if(afps__patch__coefficient__signal__enable__flag) | |
|     mdu__coefficient__size[ tileID ][ patchIdx ] | ue(v) |
|   for( j = 0; j < mdu__coefficient__size; j++ ) { | |
|     mdu__coefficient__byte[ tileID ][ patchIdx ] | u(8) |
|   } | |
| } | |

In another embodiment, signaling of coefficients in the patch data can be controlled by a flag in the corresponding Atlas Sequence Parameter set.

In another embodiment, the flag in Atlas Frame Parameter set can be controlled by the flag in Atlas Sequence Parameter set.

In another embodiment, the mdu_coefficient_size is not signaled but the size of the coefficient is inferred as being equal to mdu_vertex_count_minus1+1. In this case, an example of the syntax table is as follows:

| | descriptor |
|---|---|
| mesh intra__data__unit( tileID, patchIdx ) { | |
| ... | |
|   mdu__vertex__count__minus1[ tileID ][ patchIdx ] | ue(v) |
|   ... | ue(v) |
|   for( j = 0; j < mdu__vertex__count__minus1+1; j++ ) { | |
|     mdu__coefficient__byte | u(8) |
|   } | |
| } | |

If the flags from Atlas Frame Parameter set or Atlas Sequence Parameter set control the signaling mechanism, the flags apply directly to the signaling loop as follows:

| | descriptor |
|---|---|
| mesh__intra__data__unit( tileID, patchIdx ) { | |
| ... | |
|   mdu__vertex__count__minus1 [ tileID ][ patchIdx ] | ue(v) |
|   ... | ue(v) |

| | descriptor |
|---|---|
| if(afps_patch_coefficient_signal_enable_flag){<br>    for( j = 0; j < mdu_vertex_count_minus1+1; j++ ) {<br>        mdu_coefficient_byte<br>    }<br>  }<br>} | u(8) |

When the current patch is predicted from its reference patch, mdu_coefficient_size and mdu_coefficient_byte can be explicitly signaled.

In another embodiment, mdu_coefficient_size and mdu_coefficient_byte may be set to be the same as those of the reference patch. In this case, the elements mdu_coefficient_size and mdu_coefficient_byte may not be signaled at all.

In another embodiment, mdu_coefficient_size may be signaled explicitly. Then, the difference between the coefficient values of the current patch and the coefficient values of the reference patch can be signaled. When the current coefficient size is bigger than the reference's, the coefficient values of the reference patch are inferred to be equal to 0. In another embodiment it can be inferred as being equal to the value of the last coefficient in the current patch.

In another embodiment, mdu_coefficient_size is inferred from the size signaled in the reference patch. Then, the coefficient values are signaled. In another case, the difference between the coefficient values of the current patch and the coefficient values of the reference patch can be signaled. When the current coefficient size is bigger than the reference's, the coefficient values of the reference patch are inferred as 0. When the coefficient values of the current patch are $\vec{C}=\{C_0, C_1, \ldots C_k \ldots \}$ and the number of the coefficients is Nc, the coefficient values of the reference patch are $\vec{R}=\{R_0, R_1, \ldots R_k \ldots \}$ and the number of coefficients is Nr, the $C_k$ can be described as follows:

$$C_k = \begin{cases} R_k & k < Nr \\ 0 & k \geq Nr \end{cases}$$

In another embodiment it can be inferred as being equal to the value of the last coefficient in the current patch as follows:

$$C_k = \begin{cases} R_k & k < Nr \\ R_{Nr-1} & k \geq Nr \end{cases}$$

When some information of the current patch is predicted from its reference patch and some is explicitly signaled in a mesh merge data unit, the same methods as described above can be applied.

In another embodiment, additional coefficients to ones from the reference patch can be signaled. The final coefficients will be a consecutive series of the ones from the reference patch and the ones signaled. For example:

| | descriptor |
|---|---|
| mesh_merge_data_unit( tileID, patchIdx ) {<br>...<br>    mmdu_additional_coefficient_size[ tileID ][ patchIdx ] | ue(v) |

| | descriptor |
|---|---|
| for( j = 0; j < mmdu_additional_coefficient_size; j++ ) {<br>        mmdu_coefficient_byte<br>    }<br>} | u(8) |

In another embodiment, the size can indicate the difference between the current coefficient size and the reference's. When the size is smaller than 0, mmdu_coefficient_byte may not be signaled at all. The current coefficient size is derived as (mmdu_vertex_count_minus1+1+mmdu_additional_coefficient_size) and only that size of the referenced coefficient values will be used.

| | descriptor |
|---|---|
| mesh_mesh_data_unit( tileID, patchIdx ) {<br>...<br>    mmdu_additional_coefficient_size[ tileID ][ patchIdx ]<br>    if(mmdu_additional_coefficient_size>0)<br>        for( j = 0; j < mmdu_additional_coefficient_size; j++ ) {<br>            mmdu_coefficient_byte<br>        }<br>    }<br>} | se(v)<br><br><br>u(8) |

In some embodiments, mdu_coefficient_size and mdu_coefficient_byte can be explicitly signaled.

In another embodiment, mdu_coefficient_size and mdu_coefficient_byte are to be the same as those of the reference patch. In this case, mdu_coefficient_size and mdu_coefficient_byte may not be signaled at all.

In another embodiment, mdu_coefficient_size is signaled explicitly. Then, the difference between the coefficient values of the current patch and the coefficient values of the reference patch can be signaled. When the current coefficient size is bigger than the reference's, the coefficient values of the reference patch are inferred as 0. In another embodiment it can be inferred as the value of the last coefficient in the current patch.

In another embodiment, mdu_coefficient_size is inferred from the size signaled in the reference patch. Then, the coefficient values are signaled. In other cases, the difference between the coefficient values of the current patch and the coefficient values of the reference patch can be signaled. When the current coefficient size is bigger than the reference's, the coefficients whose indices are bigger than the last index of the reference's are inferred as 0. In another embodiment it can be inferred as the value of the last coefficient in the current patch.

For the skip patch mode, no information is signaled. When it is decoded, all the information including the coefficients in the reference patch will be copied to be used as its own.

When the coefficient data can be signaled in the patch data, each patch data can indicate if its corresponding coefficient data is in the patch unit (Atlas Data sub-bitstream) or in the video (Geometry video sub-bitstream). In this case each patch will have a flag to indicate it as below. When the flag (e.g., mdu_coeficient_in_outstream_flag), is equal to 1 (true), which indicates that the coefficient values are in the video stream, the position and size for the geometry information is signaled. In this case, the coefficient values are signaled only when the flag is equal to 0 (false).

| | de-scriptor |
|---|---|
| mesh_intra_data_unit( tileID, patchIdx ) { | |
| ... | |
|    mdu_coefficient_in_video_flag[ tileID ][ patchIdx ] | |
| ... | |
|    if(mdu_coefficient_in_video_flag){ | |
|       mdu_geometry_2d_pos_x[ tileID ][ patchIdx ] | ue(v) |
|       mdu_geometry_2d_pos_y[ tileID ][ patchIdx ] | ue(v) |
|       mdu_geometry_2d_size_x_minus1[ tileID ][ patchIdx ] | ue(v) |
|       mdu_geometry_2d_size_y_minus1[ tileID ][ patchIdx ] | ue(v) |
|    } | |
| ... | |
|    if(!mdu_coefficient_in_video_flag){ | |
|       mdu_coefficient_size[ tileID ][ patchIdx ] | ue(v) |
|       for( j = 0; j < mdu_coefficient_size; j++ ) { | |
|          mdu_coefficient_byte[ tileID ][ patchIdx ] | u(8) |
|       } | |
|    } | |
| } | |

In another embodiment, patch data units dedicated to signal coefficient data can be defined. Namely, coefficient intra data unit, coefficient inter data unit, coefficient merge data unit and coefficient skip data unit. The syntax table for the coefficient intra data unit can be as follows:

| | descriptor |
|---|---|
| coefficient intra data unit ( tileID, patchIdx ) { | |
|    cdu_patch_id[ tileID ][ patchIdx ] | ue(v) |
|    cdu_coefficient_size[ tileID ][ patchIdx ] | ue(v) |
|       for( j = 0; j < cdu_coefficient_size; j++ ) { | |
|          cdu_coefficient_byte[ tileID ][ patchIdx ] | u(8) |
|       } | |

In some embodiments, cdu_patch_id indicates the index of the patch that the current coefficient data unit corresponds to. Also, in some embodiments, cdu_coefficient_size indicates the size of the coefficient data.

For the coefficient inter data unit, the index of the reference coefficient data unit is signaled. When the number of coefficients (or the size of the coefficients data) is different from that of the reference, the newly added coefficients are signaled. In the following example, cduCoefficientDiffSize is the same as cdu_coefficient_size_diff when cdu_coefficient_size_diff is positive. Otherwise, it is set as 0.

| | descriptor |
|---|---|
| coefficient inter data unit ( tileID, patchIdx ) { | |
|    cdu_reference_coefficient_data_id[ tileID ][ patchIdx ] | ue(v) |
|    cdu_coefficient_size_diff[ tileID ][ patchIdx ] | se(v) |
|       for( j = 0; j < cduCoefficientDiffSize; j++ ) { | |
|          cdu_remaining_coefficient_byte[ tileID ][ patchIdx ] | u(8) |
|       } | |

In another embodiment, cdu_remaining_coefficient_byte is not signaled but, when the current coefficient size is bigger than the reference's, the coefficients whose indices are bigger than the last index of the reference's are inferred as 0. In another embodiment it can be inferred as the value of the last coefficient in the current patch.

The coefficient skip data unit can be described as follows:

| | descriptor |
|---|---|
| coefficient skip data unit ( tileID, patchIdx ) { | |
| } | |

When the coefficient data can be signaled in the patch data and also a new sub-bitstream only for the displacement data (Coefficient data) is defined as further described below, each patch data unit can indicate if its corresponding coefficient data is in the patch unit (Atlas Data sub-bitstream) or in the new sub-bitstream (Displacement sub-bitstream). When the flag, mdu_coefficient_in_outstream_flag is true, it indicates that the coefficient values are in the Displacement Data sub-bitstream. The coefficient values are signaled only when the flag is false. Since, the video stream may not be used at all, the patch information for the geometry video, such as mdu_geometry_2d_pos_x, mdu_geometry_2d_pos_y, mdu_geometry_2d_size_x_minus1, and mdu_geometry_2d_size_y_minus1, does not need to be signaled.

In another embodiment, each patch can signal the corresponding coefficients in the video sub-bitstream, in the atlas data sub-bitstream or in the displacement data sub-bitstream. In this case, instead of a flag, an index, mdu_coeficient_stream_index, can be signaled. For example, when mdu_coeficient_stream_index is 0, the coefficients are signaled in the video and it requires the 2d position and size information in the patch. When mdu_coeficient_stream_index is 1, the coefficients are signaled in the displacement data sub-bitstream. When mdu_coeficient_stream_index is 2, the coefficients are signaled in the patch data unit (e.g., atlas data sub-bitstream). When mdu_coeficient_stream_index is 1 or 2, the 2d position and size information is not needed in the patch data unit. When mdu_coeficient_stream_index is 0 or 1, the coefficient values are not signaled in the patch data unit (e.g. atlas data sub-bitsream). The index can be different than 0, 1 or 2. In another embodiment, there can be more than 3 cases, i.e., coefficients are signaled only in the video sub-bitstream, coefficients are signaled only in the displacement sub-bitstream, and coefficients are signaled only in the atlas data sub-bitstream. The coefficients of the patch can be signaled both in the patch data unit (atlas data sub-bitstream) and in another sub-bitstream. In this case, the coefficients in the patch data unit come first.

Displacement Data Sub-Bitstream

In some embodiments, the displacement data (transformed into wavelet coefficients or otherwise) can be signaled in a separate sub-bitstream independently from other sub-bitstreams such as the Atlas Data sub-bitstream, Base Mesh sub-bitstream, or the video sub-bitstream. In this case, the displacement data sub-bitstream structure has its own high-level syntax to ensure partial decoding, random accessibility, inter prediction and more are enabled. The displacement data sub-bitstream can include Displacement Sequence Parameter sets, Displacement Frame Parameter sets, and Displacement Tile Layers. Each tile layer may have a header that contains a frame parameter set id, tile type (intra, inter, merge, skip), the size of its payload, etc. The payload contains the displacement data, such as wavelet transform coefficients. When the displacement data sub-bitstream is used, the transform information that would otherwise be signaled in the Atlas data sub-bitstream, such as the transform parameter set, is instead signaled in the displacement data sub-bitstream. The signaling mechanism for how the transform parameter set is signaled in the displacement data sub-bitstream is a similar signaling mechanism as described above for when the displacement data is signaled din the atlas data sub-bitstream.

NAL Unit Syntax for Displacement Data Sub-Bitstream

As discussed above, the displacement data sub-bitstream is also based on NAL units, and it is similar to those of the atlas sub-bitstream. As a NAL sample stream, NAL unit size precision may be signaled at the beginning of the displacement data sub-bitstream and NAL unit size (interpreted to NumBytesInalUnit) may be signaled per NAL unit. An example syntax is provided below.

---

General NAL unit Syntax

---

```
disp_nal_unit( NumBytesInNalUnit ) {
    disp_nal_unit_header( )
    NumBytesInRbsp = 0
    for( i = 2; i < NumBytesInNalUnit; i++ )
        rbsp_byte[ NumBytesInRbsp++ ]          b(8)
}
```

---

---

NAL unit header syntax

---

```
disp_nal_unit_header( ) {
    disp_nal_forbidden_zero_bit          f(1)
    disp_nal_unit_type                   u(6)
    disp_nal_layer_id                    u(6)
    disp_nal_temporal_id_plus1           u(3)
}
```

---

NAL Unit Semantics for the Displacement Data Sub-Bitstream

This section contains some of the semantics that correspond to the above syntax structures.

1. General NAL Unit Semantics

NumBytesInNalUnit specifies the size of the NAL unit in bytes. This value is used for decoding of the NAL unit. Some form of demarcation of NAL unit boundaries is necessary to enable inference of NumBytesInNalUnit.

rbsp_byte[i] is the i-th byte of an RBSP (raw byte sequence payload). An RB SP is specified as an ordered sequence of bytes as follows:

The RBSP contains a string of data bits (SODB) as follows:

If the SODB is empty (i.e., zero bits in length), the RBSP is also empty.

Otherwise, the RBSP contains the SODB as follows:

1) The first byte of the RBSP contains the first (most significant, left-most) eight bits of the SODB; the next byte of the RBSP contains the next eight bits of the SODB, etc., until fewer than eight bits of the SODB remain.

2) The rbsp_trailing_bits( ) syntax structure is present after the SODB as follows:

i) The first (most significant, left-most) bits of the final RBSP byte contain the remaining bits of the SODB (if any).

ii) The next bit consists of a single bit equal to 1 (e.g., rbsp_stop_one_bit).

iii) When the rbsp_stop_one_bit is not the last bit of a byte-aligned byte, one or more bits equal to 0 (e.g., instances of rbsp_alignment_zero_bit) are present to result in byte alignment.

Syntax structures having these RB SP properties are denoted in the syntax tables using an "_rbsp" suffix. These structures are carried within NAL units as the content of the rbsp_byte[i] data bytes. The association of the RB SP syntax structures to the NAL units is as specified in the following tables.

In some embodiments, when the boundaries of the RBSP are known, the decoder can extract the SODB from the RB SP by concatenating the bits of the bytes of the RB SP and discarding the rbsp_stop_one_bit, which is the last (least significant, right-most) bit equal to 1, and discarding any following (less significant, farther to the right) bits that follow it, which are equal to 0. The data necessary for the decoding process is contained in the SODB part of the RBSP.

NAL Unit Header Semantics for the Displacement Data Sub-Bitstream

Similar NAL unit types, as for the atlas data sub-bitstream, such as were defined for the coefficient enabling functionalities for random access and segmentation of the mesh may be used. In the displacement data sub-bitstream, the concept of a displacement tile and specific nal units are defined to correspond to coded mesh data. In addition, NAL units that can include metadata such as SEI messages are defined.

In particular, the coefficient NAL unit types supported are specified as follows:

| disp_nal_unit_type | Name of disp_nal_unit_type | Content of coefficient NAL unit and RBSP syntax structure | NAL unit type class |
|---|---|---|---|
| 0 | NAL_TRAIL_N | Coded displacement tileof a non- | DCL |
| 1 | NAL_TRAIL_R | TSA, non STSA trailing coefficient frame disp_tile_layer_rbsp( ) | |
| 2 | NAL_TSA_N | Coded displacement tileof a TSA | DCL |
| 3 | NAL_TSA_R | coefficient frame disp_tile_layer_rbsp( ) | |
| 4 | NAL_STSA_N | Coded displacement tileof a STSA | DCL |
| 5 | NAL_STSA_R | coefficient frame disp_tile_layer_rbsp( ) | |
| 6 | NAL_RADL_N | Coded displacement tileof a RADL | DCL |
| 7 | NAL_RADL_R | coefficient frame disp_tile_layer_rbsp( ) | |

-continued

| disp_nal_unit_type | Name of disp_nal_unit_type | Content of coefficient NAL unit and RBSP syntax structure | NAL unit type class |
|---|---|---|---|
| 8 9 | NAL_RASL_N NAL_RASL_R | Coded displacement tileof a RASL coefficient frame disp_tile_layer_rbsp( ) | DCL |
| 10 11 | NAL_SKIP_N NAL_SKIP_R | Coded displacement tileof a skipped coefficient frame disp_tile_layer_rbsp( ) | DCL |
| 12 14 | NAL_RSV_DCL_N12 NAL_RSV_DCL_N14 | Reserved non-IRAP sub-layer non-reference DCL NAL unit types | DCL |
| 13 15 | NAL_RSV_DCL_R13 NAL_RSV_DCL_R15 | Reserved non-IRAP sub-layer reference DCL NAL unit types | DCL |
| 16 17 18 | NAL_BLA_W_LP NAL_BLA_W_RADL NAL_BLA_N_LP | Coded displacement tile of a BLA coefficient frame disp_tile_layer_rbsp( ) | DCL |
| 19 20 | NAL_IDR_W_RADL NAL_IDR_N_LP | Coded displacement tile of an IDR coefficient frame disp_tile_layer_rbsp( ) | DCL |
| 21 | NAL_CRA | Coded displacement tile of a CRA coefficient frame disp_tile_layer_rbsp( ) | DCL |
| 22 23 | NAL_RSV_IRAP_DCL_22 NAL_RSV_IRAP_DCL_23 | Reserved IRAP DCL NAL unit types | DCL |
| 24 . . . 29 | NAL_RSV_DCL_24 . . . NAL_RSV_DCL_29 | Reserved non-IRAP DCL NAL unit types | DCL |
| 30 | NAL_DSPS | Displacement sequence parameter set disp_sequence_parameter_set_rbsp( ) | non-DCL |
| 31 | NAL_BMFPS | Displacement frame parameter set disp_frame_parameter_set_rbsp( ) | non-DCL |
| 32 | NAL_AUD | Access unit delimiter access_unit_delimiter_rbsp( ) | non-DCL |
| 33 | NAL_EOS | End of sequence end_of_sequence_rbsp( ) | non-DCL |
| 34 | NAL_EOB | End of bitstream end_of_disp_sub_bitstream_rbsp( ) | non-DCL |
| 35 | NAL_FD | Filler filler_data_rbsp( ) | non-DCL |
| 36 37 | NAL_PREFIX_NSEI NAL_SUFFIX_NSEI | Non-essential supplemental enhancement information sei_rbsp( ) | non-DCL |
| 38 39 | NAL_PREFIX_ESEI NAL_SUFFIX_ESEI | Essential supplemental enhancement information sei_rbsp( ) | non-DCL |
| 40 . . . 44 | NAL_RSV_NDCL_40 NAL_RSV_NDCL_44 | Reserved non-DCL NAL unit types | non-DCL |
| 45 . . . 63 | NAL_UNSPEC_45 NAL_UNSPEC_63 | Unspecified non-DCL NAL unit types | non-DCL |

The primary syntax structure that is defined for a displacement bitstream is a sequence parameter set. This syntax structure contains basic information about the bitstream, identifying features for the codecs supported for either the intra coded and inter coded meshes, as well as information about references.

General displacement sequence parameter set RBSP syntax

| | Descriptor |
|---|---|
| disp_sequence_parameter_set_rbsp( ) { | |
| dsps_sequence_parameter_set_id | u(4) |
| disp_profile_tier_level( ) | |
| dsps_displacement_coordinate_system | u(1) |
| dsps_transform_index | u(3) |
| if(dsps_transform_index == LINEAR_LIFTING) { | |
| vmc_lifting_transform_parameters( 0, 0 ) | |
| } | |
| dsps_log2_max_mesh_frame_order_cnt_lsb_minus4 | ue(v) |
| dsps_max_dec_mesh_frame_buffering_minus1 | ue(v) |
| dsps_long_term_ref_mesh_frames_flag | u(1) |
| dsps_num_ref_mesh_frame_lists_in_dsps | ue(v) |

-continued

General displacement sequence parameter set RBSP syntax

| | Descriptor |
|---|---|
| for( i = 0; i < dsps_num_ref_mesh_frame_lists_in_dsps; i++ ) | |
| disp_ref_list_struct( i ) | |
| dsps_displacement_data_size_precision_bytes_minus1 | u(8) |
| dsps_extension_present_flag | u(1) |
| if( dsps_extension_present_flag ) { | |
| dsps_extension_count_minus1 | u(7) |
| } | |
| if( dsps_extension_present_flag ){ | |
| dsps_extensions_length_minus1 | ue(v) |
| while( more_rbsp_data( ) ) | |
| dsps_extension_data_flag | u(1) |
| } | |
| rbsp_trailing_bits( ) | |
| } | | dsps_displacement_data_size_precision_bytes_minus1 (+1) specifies the precision, in bytes, of the size of the displacement data.

dsps_transform_index indicates which transform is used for the displacement in the sequence. 0 can indicate none applied.

When the transform is LINEAR_LIFTING, the transform parameters can be signaled as vmc_lifting_transform_parameters.

| | descriptor |
|---|---|
| vmc_lifting_transform_parameters( attributeIndex, ltpIndex ){ | |
|   vmc_transform_lifting_skip_update[attributeIndex][ ltpIndex ] | u(1) |
|   vmc_transform_lifting_quantization_parameters_x[attributeIndex][ ltpIndex ] | ue(v) |
|   vmc_transform_lifting_quantization_parameters_y[attributeIndex][ ltpIndex ] | ue(v) |
|   vmc_transform_lifting_quantization_parameters_z[attributeIndex][ ltpIndex ] | ue(v) |
|   vmc_transform_log2_lifting_lod_inverseScale_x[attributeIndex][ ltpIndex ] | ue(v) |
|   vmc_transform_log2_lifting_lod_inverseScale_y[attributeIndex][ ltpIndex ] | ue(v) |
|   vmc_transform_log2_lifting_lod_inverseScale_z[attributeIndex][ ltpIndex ] | ue(v) |
|   vmc_transform_log2_lifting_update_weight[attributeIndex][ ltpIndex ] | ue(v) |
|   vmc_transform_log2_lifting_prediction_weight[attributeIndex] [ ltpIndex ] | ue(v) |
| } | |

| Coefficient Profile, Tier, and Level Syntax | |
|---|---|
| | Descriptor |
| disp_profile_tier_level( ) { | |
|   dptl_tier_flag | u(1) |
|   dptl_profile_toolset_idc | u(8) |
|   dptl_reserved_zero_32bits | u(32) |
|   dptl_level_idc | u(8) |
|   dptl_num_sub_profiles | u(6) |
|   dptl_extended_sub_profile_flag | u(1) |
|   for( i = 0; I < ptl_num_sub_profiles; i++ ) { | |
|     dptl_sub_profile_idc[ i ] | u(v) |
|   } | |
|   dptl_toolset_constraints_present_flag | u(1) |
|   if( dptl_toolset_constraints_present_flag ) { | |
|     disp_profile_toolset_constraints_information( ) | |
|   } | |
| } | | dptl_extended_sub_profile_flag providing support for sub profiles can be quite useful for further restricting the coefficient profiles depending on usage and applications.

Displacement Frame Parameter Set RBSP Syntax for the Displacement Data Sub-Bitstream The displacement frame parameter set has the frame level information such as number of displacement tile(dispTile)s in the frames corresponding to one disp_frm_order_cnt_lsb. The displacement data for a mesh data patch is coded in one displacement_data_tile_layer( ) and is independently decodable from other dispTiles. In the case of inter frame prediction, a dispTile can refer only to the dispTiles with the same dh_id in its associated reference frames.

| | De-scriptor |
|---|---|
| disp_frame_parameter_set_rbsp( ) { | |
|   dfps_mesh_sequence_parameter_set_id | u(4) |
|   dfps_mesh_frame_parameter_set_id | u(4) |
|   disp_tile_information( ) | |
|   dfps_output_flag_present_flag | u(1) |
|   dfps_num_ref_idx_default_active_minus1 | ue(v) |
|   dfps_additional_lt_afoc_lsb_len | ue(v) |
|   dfps_extension_present_flag | u(1) |

-continued

| | De-scriptor |
|---|---|
|   if( dfps_extension_present_flag ) | |
|     dfps_extension_8bits | u(8) |

-continued

| | De-scriptor |
|---|---|
|   if( dfps_extension_8bits ) | |
|     while( more_rbsp_data( ) ) | |
|       dfps_extension_data_flag | u(1) |
|   rbsp_trailing_bits( ) | |
| } | |
| disp_tile_information( ) { | |
|   dti_use_single_tile_flag | u(1) |
|   if(!bsmi_use_single_tile_flag){ | |
|     dti_num_tiles_minus1 | u(8) |
|   } | |
|   Else | |
|     dti_num_tiles_minus1 = 0 | |
|   dti_signalled_tile_id_flag | u(1) |
|   if( dti_signalled_tile_id_flag ) { | |
|     dti_signalled_tile_id_length_minus1 | ue(v) |
|     for( i = 0; i < dti_signalled_tile_id_length_minus1+1; i++ ) | |
|       dti_tile_id[ i ] | u(v) |
|       DispIDToIndex[ dti_tile_id[ i ] ] = i | |
|       DispIndexToID[ i ] = dti_tile_id[ i ] | |
|     } | |
|   } | |
|   else | |
|     for( i = 0; i < dti_num_tiles_minus1 + 1; i++ ) { | |
|       dti_tile_id[ i ] = i | |
|       DispIDToIndex[ i ] = i | |
|       DispIndexToID[ i ] = i | |
|     } | |
| } | |

Displacement Tile Layer RBSP Syntax in the Displacement Data Sub-Bitstream

A disp_tile_layer contains a tile information. One or more disp_tile_layer_rbsp can correspond to one frame indicated by dh_frm_order_cnt_lsb. DispUnitSize can be derived from NumBytesInNalUnit and the size of the disp_header( ) In another embodiment, the size can be explicitly signalled in disp_header( )

```
disp__tile__layer__rbsp( ) {
    disp__header( )
    disp__data__unit(DispUnitSize )
    rbsp__trailing__bits( )
}
```

| Displacement header syntax | De-scriptor |
|---|---|
| disp__header( ) { | |
| if( nal__unit__type >= NAL__BLA__W__LP && | |
| nal__unit__type <= NAL__RSV__IRAP__ACL__29 ) | |
| dh__no__output__of__prior__disp__frames__flag | u(1) |
| dh__disp__frame__parameter__set__id | u(4) |
| dh__id | u(v) |
| dispID = dh__id | |
| dh__type | ue(v) |
| if( dfps__output__flag__present__flag ) | |
| dh__ output__flag | u(1) |
| dh__frm__order__cnt__lsb | u(v) |
| if( dsps__num__ref__mesh__frame__lists__in__dsps > 0 ) | |
| dh__ref__ frame__list__dsps__flag | u(1) |
| if( dh__ref__frame__list__dsps__flag == 0 ) | |
| ref__list__struct( | |
| dsps__num__ref__frame__lists__in__dsps ) | |
| else if( dsps__num__ref__frame__lists__in__dsps > 1 ) | |
| dh__ref__frame__list__idx | u(v) |
| for( j = 0; j < NumLtrFrmEntries[ RlsIdx ]; j++ ) { | |
| msh__additional__dfoc__lsb__present__flag[ j ] | u(1) |
| if( msh__additional__dfoc__lsb__present__flag[ j ] ) | |
| msh__additional__dfoc__lsb__val[ j ] | u(v) |
| } | |
| if( dh__type != SKIP__DISP ) { | |
| if( dh__type == P__DISP | |
| && num__ref__entries[ RlsIdx ] > 1 ) { | |
| msh__num__ref__idx__active__override__flag | u(1) |
| if( msh__num__ref__idx__active__override__flag ) | |
| msh__num__ref__idx__active__minus1 | ue(v) |
| } | |
| } | |
| byte__alignment( ) | |
| } | | dh_id is the id of the current displacement contained in the mesh data disp data.

dh_type indicates how the displacement is coded. If dh_type is I_DISP, the data is not predicted from any other frames or tiles. If dh_type is P_DISP or M_DISP, inter prediction is used to code the displacement data.

| | mfh__disp__type | name of mfh__disp__type |
|---|---|---|
| 1 | 0 | I__DISP |
| 2 | 1 | P__DISP |
| 3 | 2 | M__DISP |
| 4 | 3 | SKIP__DISP |

| Displacement data unit | Descriptor |
|---|---|
| disp__data__unit(DispUnitSize ) { | |
| for( j = 0; j < DispUnitSize ; j++ ) { | |
| coefficient__byte | u(8) |
| } | |

In some embodiments, disp data unit(unitSize) contains a displacement unit stream of size unitSize, in bytes, as an ordered stream of bytes or bits within which the locations of unit boundaries are identifiable from patterns in the data. The coefficient_byte can be interpreted as described in section 5 using dh_type as the patch type and dispUnitSize as the coefficient_size. In this case, the coefficient_sizes is not predicted at all.

In some embodiments, indices for patches can be signaled in both the atlas data sub-bitstream and the in the displacement data sub-bitstream. For example, in the case that the patches in the atlas data sub-bitstream need to find the corresponding patches in the displacement data sub-bitstream, the corresponding displacement patch indices can be signaled in the mesh patch data unit. In another embodiment, the corresponding mesh patch data unit can be signaled in the displacement patch data unit.

Example Computer System

Figure 16:
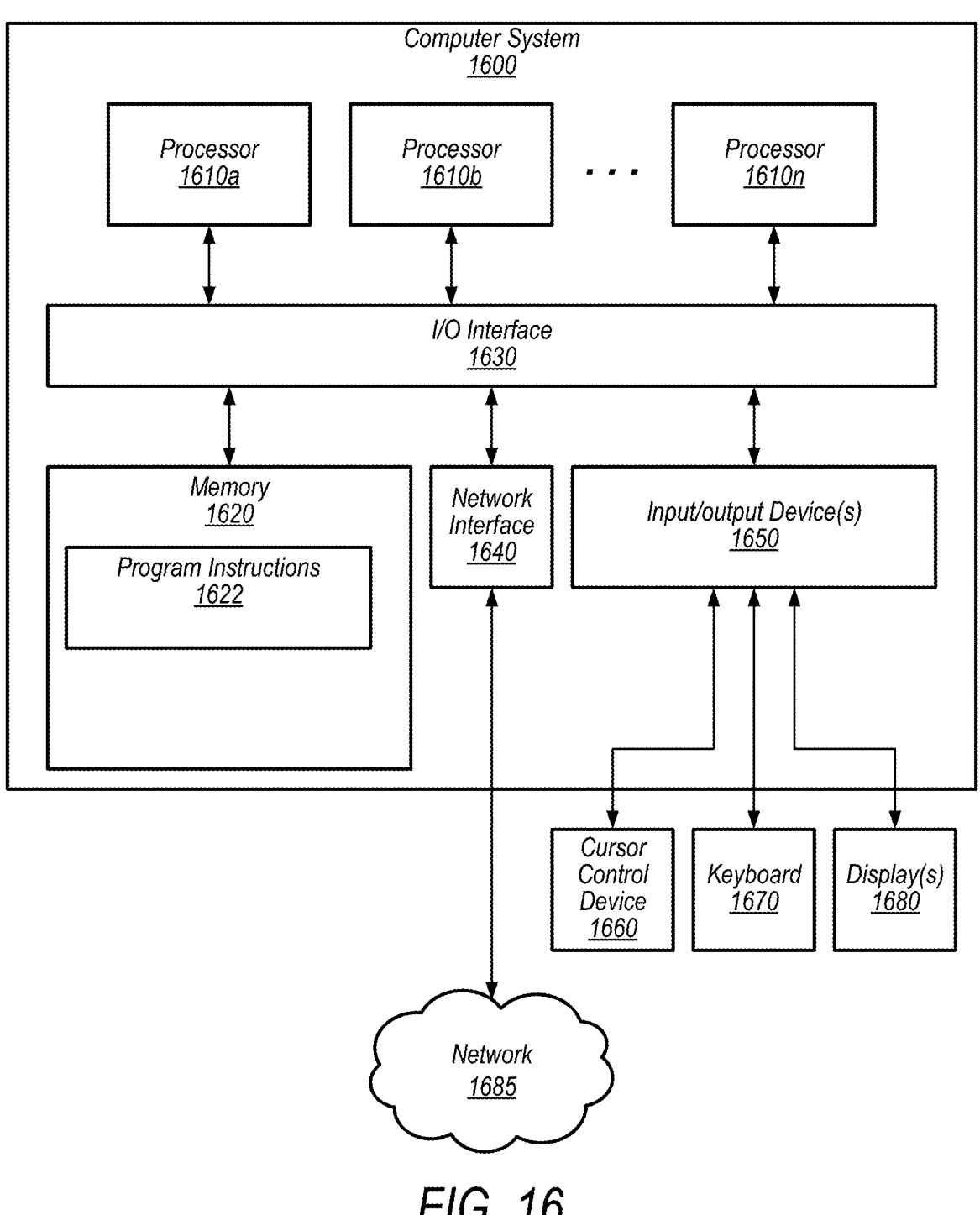
FIG. 16 illustrates an example computer system that may implement an encoder or decoder, according to some embodiments.

FIG. 16 illustrates an example computer system 1600 that may implement an encoder or decoder or any other ones of the components described herein, (e.g., any of the components described above with reference to FIGS. 1-15), in accordance with some embodiments. The computer system 1600 may be configured to execute any or all of the embodiments described above. In different embodiments, computer system 1600 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a point cloud encoder or decoder, as described herein may be executed in one or more computer systems 1600, which may interact with various other devices. Note that any component, action, or functionality described above with respect to FIGS. 1-15 may be implemented on one or more computers configured as computer system 1600 of FIG. 16, according to various embodiments. In the illustrated embodiment, computer system 1600 includes one or more processors 1610 coupled to a system memory 1620 via an input/output (I/O) interface 1630. Computer system 1600 further includes a network interface 1640 coupled to I/O interface 1630, and one or more input/output devices 1650, such as cursor control device 1660, keyboard 1670, and display(s) 1680. In some cases, it is contemplated that embodiments may be implemented using a single instance of computer system 1600, while in other embodiments multiple such systems, or multiple nodes making up computer system 1600, may be configured to host different portions or instances of embodiments. For example, in one embodiment some elements may be implemented via one or more nodes of computer system 1600 that are distinct from those nodes implementing other elements.

In various embodiments, computer system 1600 may be a uniprocessor system including one processor 1610, or a multiprocessor system including several processors 1610 (e.g., two, four, eight, or another suitable number). Processors 1610 may be any suitable processor capable of executing instructions. For example, in various embodiments processors 1610 may be general-purpose or embedded processors implementing any of a variety of instruction set architectures (ISAs), such as the x86, PowerPC, SPARC, or MIPS ISAs, or any other suitable ISA. In multiprocessor systems, each of processors 1610 may commonly, but not necessarily, implement the same ISA.

System memory 1620 may be configured to store point cloud compression or point cloud decompression program instructions 1622 and/or sensor data accessible by processor 1610. In various embodiments, system memory 1620 may be implemented using any suitable memory technology, such as static random-access memory (SRAM), synchronous dynamic RAM (SDRAM), nonvolatile/Flash-type memory, or any other type of memory. In the illustrated embodiment, program instructions 1622 may be configured to implement an image sensor control application incorporating any of the functionality described above. In some embodiments, program instructions and/or data may be received, sent or stored upon different types of computer-accessible media or on similar media separate from system memory 1620 or computer system 1600. While computer system 1600 is described as implementing the functionality of functional blocks of previous Figures, any of the functionality described herein may be implemented via such a computer system.

In one embodiment, I/O interface 1630 may be configured to coordinate I/O traffic between processor 1610, system memory 1620, and any peripheral devices in the device, including network interface 1640 or other peripheral interfaces, such as input/output devices 1650. In some embodiments, I/O interface 1630 may perform any necessary protocol, timing or other data transformations to convert data signals from one component (e.g., system memory 1620) into a format suitable for use by another component (e.g., processor 1610). In some embodiments, I/O interface 1630 may include support for devices attached through various types of peripheral buses, such as a variant of the Peripheral Component Interconnect (PCI) bus standard or the Universal Serial Bus (USB) standard, for example. In some embodiments, the function of I/O interface 1630 may be split into two or more separate components, such as a north bridge and a south bridge, for example. Also, in some embodiments some or all of the functionality of I/O interface 1630, such as an interface to system memory 1620, may be incorporated directly into processor 1610.

Network interface 1640 may be configured to allow data to be exchanged between computer system 1600 and other devices attached to a network 1685 (e.g., carrier or agent devices) or between nodes of computer system 1600. Network 1685 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1650 may, in some embodiments, include one or more display terminals, keyboards, keypads, touchpads, scanning devices, voice or optical recognition devices, or any other devices suitable for entering or accessing data by one or more computer systems 1600. Multiple input/output devices 1650 may be present in computer system 1600 or may be distributed on various nodes of computer system 1600. In some embodiments, similar input/output devices may be separate from computer system 1600 and may interact with one or more nodes of computer system 1600 through a wired or wireless connection, such as over network interface 1640.

As shown in FIG. 16, memory 1620 may include program instructions 1622, which may be processor-executable to implement any element or action described above. In one embodiment, the program instructions may implement the methods described above. In other embodiments, different elements and data may be included. Note that data may include any data or information described above.

Those skilled in the art will appreciate that computer system 1600 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1600 may be transmitted to computer system 1600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A non-transitory, computer-readable, storage medium storing program instructions, that when executed using one or more computing devices, cause the one or more computing devices to:

compress visual volumetric content using a dynamic mesh compression algorithm, wherein compressing the visual volumetric comprises:

compressing a base mesh to generate a base mesh sub-bitstream to be included in a bitstream for the compressed visual volumetric content;

determining displacement information for displacements that are to be applied to sub-division locations of the base mesh; and compressing attribute information, wherein the compressed attribute information is to be included in a video sub-bitstream of the bitstream for the compressed visual volumetric content; and provide the bitstream for the compressed visual volumetric content, wherein the displacement information is signaled, at least in part, in the bitstream in a sub-bitstream other than the video sub-bitstream, and wherein the sub-bitstream used to signal the displacement information uses a syntax that is independent of other syntaxes used for other ones of the sub-bitstreams of the bitstream.

2. The non-transitory, computer-readable, storage medium of claim 1, wherein the displacement information is signaled using a displacement data unit syntax.

3. The non-transitory, computer-readable, storage medium of claim 1, wherein patch data units for the displacement information are signaled in an atlas data sub-bitstream of the bitstream for the compressed visual volumetric content.

4. The non-transitory, computer-readable, storage medium of claim 3, wherein the displacement information is signaled, at least in part, in the sub-bitstream used to signal the displacement information using patch data units that correspond to the patch data units used in the atlas data sub-bitstream.

5. The non-transitory, computer-readable, storage medium of claim 2, wherein the displacement information is signaled, at least in part, using a sequence parameter set header of the displacement data unit syntax.

6. The non-transitory, computer-readable, storage medium of claim 5, wherein the displacement information is signaled, at least in part, using a frame parameter set header of the displacement data unit syntax.

7. The non-transitory, computer-readable, storage medium of claim 1, wherein the syntax used to signal displacement information is a displacement data unit syntax, and wherein the displacement data unit syntax is configured to enable partial decoding or random decoding of the displacement information.

8. The non-transitory, computer-readable, storage medium of claim 1, wherein the displacement information is further signaled, at least in part in the video sub-bitstream, wherein a flag in a portion of the displacement information signaled in the sub-bitstream other than the video sub-bitstream is used to signal portions of the displacement information signaled in the video sub-bitstream.

9. The non-transitory, computer-readable storage medium of claim 8, wherein the portion of the displacement information signaled in the video sub-bitstream is signaled such that:

a first displacement component is signaled in a first color plane of the video sub-bitstream;

a second displacement component is signaled in a second color plane of the video sub-bitstream; and a third displacement component is signaled in a third color plane of the video sub-bitstream, wherein one or more resolutions, at which the first, the second, and the third components of the displacement information are signaled, are adjusted to account for sub-sampling between the first, the second, and the third color planes of the video sub-bitstream.

10. The non-transitory, computer-readable, storage medium of claim 8, wherein the portion of the displacement information signaled in the video sub-bitstream is signaled using a single color plane of the video sub-bitstream.

11. The non-transitory, computer-readable storage medium of claim 8, wherein the portion of the displacement information signaled in the video sub-bitstream is signaled such that:

displacement information for different sub-meshes of the reconstructed mesh are signaled using starting points in different tiles of image frames of the video sub-bitstream.

12. A non-transitory, computer-readable, storage medium storing program instructions, that when executed using one or more computing devices, cause the one or more computing devices to:

receive a bitstream representing a compressed version of visual volumetric content, the bitstream comprising:

a base mesh sub-bitstream;

a video sub-bitstream; and displacement information for displacements that are to be applied to sub-division locations of a base mesh signaled in the base mesh sub-bitstream, wherein the displacement information is signaled, at least in part, in the bitstream in a sub-bitstream other than the video sub-bitstream, and wherein the sub-bitstream used to signal the displacement information uses a syntax that is independent of other syntaxes used for other ones of the sub-bitstreams of the bitstream; and reconstruct a mesh of the visual volumetric content, wherein to reconstruct the mesh the program instructions cause the one or more computing devices to:

sub-divide edges of the base mesh to generate the sub-division locations;

parse the bitstream to identify the displacement information; and apply the displacements indicated in the displacement information to the sub-division locations of the base mesh.

13. The non-transitory, computer-readable, storage medium of claim 12, wherein the displacement information is signaled using a displacement data unit syntax in a displacement sub-bitstream, which is a separate sub-bitstream from the video sub-bitstream, the base mesh sub-bitstream, and an atlas data sub-bitstream.

14. The non-transitory, computer-readable, storage medium of claim 12, wherein patch data units for the displacement information are signaled in an atlas data sub-bitstream of the bitstream.

15. The non-transitory, computer-readable, storage medium of claim 12, wherein the syntax used to signal the displacement information is a displacement data unit syntax, and wherein the displacement data unit syntax is configured to enable partial decoding or random decoding of the displacement information.

16. The non-transitory, computer-readable, storage medium of claim 12, wherein the displacement information is further signaled, at least in in part, in the video sub-bitstream.

17. The non-transitory, computer-readable, storage medium of claim 16, wherein a flag in a portion of the displacement information signaled in the sub-bitstream other than the video sub-bitstream is used to signal portions of the displacement information signaled in the video sub-bitstream.

18. A device, comprising:

a memory storing program instructions; and one or more processors, wherein the program instructions, when executed on or across the one or more processors, cause the one or more processors to:

receive a bitstream representing a compressed version of visual volumetric content, the bitstream comprising:

a base mesh sub-bitstream;

a video sub-bitstream; and displacement information for displacements that are to be applied to sub-division locations of a base mesh signaled in the base mesh sub-bitstream, wherein the displacement information is signaled, at least in part, in the bitstream in a sub-bitstream other than the video sub-bitstream, and wherein the sub-bitstream used to signal the displacement information uses a syntax that is independent of other syntaxes used for other ones of the sub-bitstreams of the bitstream;

reconstruct a mesh of the visual volumetric content, wherein reconstructing the mesh comprises:

sub-dividing edges of the base mesh to generate the sub-division locations;

parsing the bitstream to identify the displacement information; and applying the displace indicated in the displacement information to the sub-division locations of the base mesh.

19. The device of claim 18, wherein patch data units for the displacement information are signaled, at least in part, in an atlas data sub-bitstream of the bitstream.

20. The device of claim 18, wherein the displacement information is signaled using a displacement data unit syntax.

\* \* \* \* \*